United States Patent [19]

McKinstry

[11] Patent Number: 5,774,644
[45] Date of Patent: Jun. 30, 1998

US005774644A

[54] METHOD AND APPARATUS FOR GENERATING A PAIR OF INTEROPERATING COMMUNICATIONS PROGRAMS

[75] Inventor: Philip William McKinstry, Poughkeepsie, N.Y.

[73] Assignee: International Business Machines Corporation, Armonk, N.Y.

[21] Appl. No.: 169,444

[22] Filed: Dec. 17, 1993

[51] Int. Cl.[6] .................................................... G06F 11/00
[52] U.S. Cl. ............................. 395/783.01; 395/183.14; 395/184.01
[58] Field of Search .................... 395/183.01, 183.03, 395/183.06, 183.14, 183.15, 184.01, 185.01; 364/265, 267.91; 371/67.1

[56] References Cited

U.S. PATENT DOCUMENTS

| | | | |
|---|---|---|---|
| 4,788,637 | 11/1988 | Tamaru | 364/200 |
| 4,791,558 | 12/1988 | Chaitin et al. | 364/200 |
| 4,914,619 | 4/1990 | Harris et al. | 364/900 |
| 5,142,528 | 8/1992 | Kobayashi et al. | 370/79 |
| 5,155,847 | 10/1992 | Kirouac et al. | 395/600 |
| 5,223,788 | 6/1993 | Andreano et al. | 324/158 R |
| 5,357,627 | 10/1994 | Miyazawa et al. | 395/575 |
| 5,426,773 | 6/1995 | Chabanet et al. | 395/575 |
| 5,444,716 | 8/1995 | Jarwala et al | 371/22.3 |
| 5,448,738 | 9/1995 | Good et al. | 395/700 |
| 5,450,589 | 9/1995 | Maebayashi et al. | 395/700 |

OTHER PUBLICATIONS

"Application Development: Writing Transaction Programs for APPC/MVS", IBM Corporation,1988, 1991, pp. 1–1 through Appendix C–7.

K. Barrett et al., "Graphic APPC Configuration Interface", *IBM Technical Disclosure Bulletin*, vol. 34, No. 1, Jun. 1991, pp. 430–434.

K. Barrett et al., "Representing Domain–Dependent Data in an Object–Oriented System", *IBM Technical Disclosure Bulletin*, vol. 34, No. 6, Nov. 1991, pp. 391–300.

K.L. Barrett et al., "System Hardware Architecture Debug Expert", *IBM Technical Disclosure Bulletin*, vol. 32, No. 9A, Feb. 1990, pp. 1–3.

J.E. Bosch et al., "System Verification Using Multiple Independent Simulation Engines Running Under Common Control", *IBM Technical Disclosure Bulletin*, vol. 30, No. 1, Jun. 1987, pp. 340–342.

C. Dalglish et al., "Officevision/MVS Requestors in MVS", *IBM Technical Disclosure Bulletin*, vol. 33, No. 3B, Aug. 1990, p. 139.

D.J. Frett et al., "Direct APPN Sessions Using Dynamic Address Resolution on Lans", *IBM Technical Disclosure Bulletin*, vol. 33, No. 8, Jan. 1991, pp. 32–35.

T.J. Freund et al., "System Network Architecture Application Programmer Interface", *IBM Technical Disclosure Bulletin*, vol. 31, No. 4, Sep. 1988, pp. 416–420.

T. Hackett, "Use of XCF to Facilitate Communication Among Independent Processes", *IBM Technical Disclosure Bulletin*, vol. 33, No. 11, Apr. 1991, pp. 357–359.

(List continued on next page.)

*Primary Examiner*—Hoa T. Nguyen
*Attorney, Agent, or Firm*—W. A. Kinnaman, Jr.

[57] ABSTRACT

Apparatus and an accompanying method for automatically assessing a communicative capability of two communications programs. In particular, two pre-exiting communications programs are compared, errors in each program that inhibit communication between the programs are then determined and resolved. To accomplish this, computer code contained in one communications program is compared to that contained in the other communications program. Determining and resolving such errors ensures that the computer code contained in one communications program is responsive to computer code contained in the other communications program and vice versa. Furthermore, if only one pre-existing communications program is available, this method and apparatus generates a second communications program from the is pre-existing communications program. Consequently, the pre-existing program is fully conversant with the second communications program.

38 Claims, 15 Drawing Sheets

OTHER PUBLICATIONS

B.A. Lahman et al., "Test Care Source Code Generator", *IBM Technical Disclosure Bulletin*, vol. 34, No. 9, Feb. 1992, pp. 27–28.

T.M. McBride et al., "Verification of Client/Server Communications Configuration", *IBM Technical Disclosure Bulletin*, vol. 34, No. 5, Oct. 1991, pp. 294–296.

K.P. McGlynn, "Test Case Generator", *IBM Technical Disclosure Bulletin*, vol. 27, No. 5, Oct. 1984, pp. 3153–3155.

P.W. McKinstry, "APPC Assist, APPC Assist Technical Reference, Version 1, Release 1.0", IBM Corporation, ᶜ1991 (Jan. 8, 1991), title page through page 49.

P.W. McKinstry, "APPC Assist APPC Assist, Technical Reference, Version 1, Releast 1.0", IBM Corporation, ᶜ1991 (Apr. 22, 1992), title page through page 15.

P. McKinstry, "Large Systems Performance Evaluation and Test", Jun. 1991, title page through APPC Assist14.

T.C. Muehe et al., "Flexible Support of Built–In Instructions for a High–Level Language", *IBM Technical Disclosusre Bulletin*, vol. 34, No. 7B, Dec. 1991, pp. 47–50.

C.U. Munoz et al., "Method of Operating a Computer to Produce Test Case Programs Which Include Stream–Oriented Input/Output Data Transmission Statements", *IBM Technical Disclosure Bulletin*, vol. 26, No. 12, May 1984, pp. 6395–6403.

T. Nguyen et al., "Method to Create Local and Remote Transaction Program Names List Profiles", *IBM Technical Disclosure Bulletin*, vol. 31, No. 3, Aug. 1988, pp. 85–86.

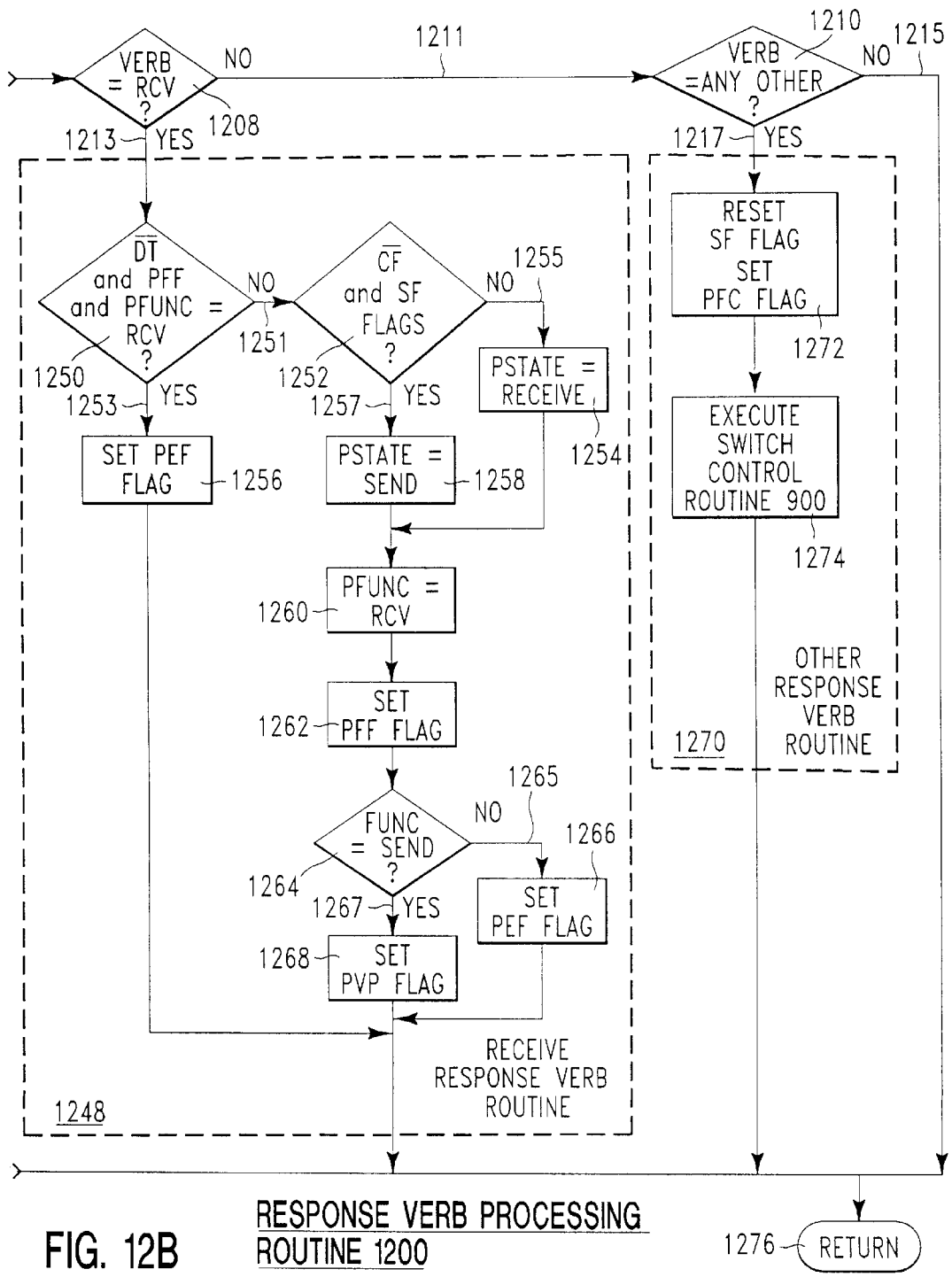
FIG. 12B  RESPONSE VERB PROCESSING ROUTINE 1200

METHOD AND APPARATUS FOR GENERATING A PAIR OF INTEROPERATING COMMUNICATIONS PROGRAMS

BACKGROUND OF THE DISCLOSURE

1. Field of the Invention

The invention relates to methods and apparatus for developing computer software that facilitates communications between computer programs, and particularly, to methods and apparatus for providing improved development of computer programs which utilize an advanced program-to-program communications (APPC) protocol.

2. Description of the Prior Art

Many organizations, in performing their business functions, require fast and accurate exchange of computer data amongst multiple computers. Such information exchange depends upon complex computer networks interconnecting various computers. One such communications network is the Systems Network Architecture (SNA) using a so-called LU 6.2 protocol developed by International Business Machines of Armonk, N.Y. SNA provides specific formats and protocols that define a variety of physical and logical SNA components. One such logical component, known as a logical unit (LU), is responsible for handling communication between end users and provides each end user with access to the SNA network. LUs are defined to meet the data transfer needs of specific end users connected to the network. In the context of an SNA network, an end user may be an application program, a stand-alone terminal, or a terminal and a human operator.

The LU 6.2 protocol defines a type of logical unit that is specifically designed to handle communications between application programs. The LU 6.2 protocol is also known in the art as an advanced program-to-program communications (APPC) protocol. As such, throughout the following discussion LU 6.2 and APPC are used interchangeably. Additionally, a program written to utilize the APPC protocol is known as an APPC program.

A typical SNA network consists of a diverse collection of platforms or nodes. Some nodes in the network may be System/370 or System/390 host computers running either an MVS or VM operating system. Other nodes may be AS/400 machines running an OS/400 operating system, or PS/2 workstations running an OS/2 operating system. System/370, System/390, AS/400, OS/400, PS/2, OS/2, MVS and VM are trademarks of International Business Machines Corporation of Armonk, N.Y.

Using the LU 6.2 protocol, an APPC program, known as a transaction program, executing on one of the nodes of the SNA network can communicate with another APPC program, known as a partner transaction program, executing on another node of the SNA network. The APPC programs communicate with one another regardless of the type of platform on which the applications are executing. Typically, the APPC programs are written as callable routines from application programs. However, the APPC programs can alternatively be imbedded within an application program. In either instance, when an application program requires information from another application program, the two application programs communicate via their respective APPC program routines.

In general, APPC programs establish communications paths between application programs in a manner analogous to two persons communicating on a telephone. In this regard, when an APPC program on a first node requests a connection to another APPC program on a second node, the APPC program executing on the first node contacts the APPC program executing on the second node to establish a communication link. Once a link is established, the APPC programs pass instructions and data from one application program to another using "polite conversation", i.e., each program sends and receives data and instructions in a half-duplex manner. The "conversation" between the programs continues until one of the programs disconnects or "hangs up" the link.

More specifically, an APPC program is designed to send and interpret particular "verbs" contained in each program. These verbs are specific instructions for the APPC programs to accomplish. For example, if the verb ALLOCATE appears in an APPC program (a first APPC program), a logical unit will initialize a communication link from that APPC program to a designated logical unit within the SNA network. The logical unit designation is contained in a number of parameters which define the ALLOCATE verb. Upon receiving an ALLOCATE verb at the designated logical unit located on another node of the SNA network, the APPC program at that node (a second APPC program) responds with a RECEIVE ALLOCATE verb. If such a response is generated, the first APPC program recognizes that a connection has been completed and, in response, begins transferring data and/or instructions from a specific application program running on its node to the second APPC program. Each data block or instruction is accompanied by a SEND verb. In response to the SEND verbs, the second APPC program generates one or more RECEIVE verbs to receive the data sent by the first APPC program. After the first APPC program has sent all the information it wishes, the first APPC program will issue a DEALLOCATE verb to end the "conversation", i.e., hang-up. As the initiator of the conversation, the first APPC program initially controls the conversation. However, during the conversation the first APPC program can relinquish control to the second APPC program. Upon the control transfer, the second APPC program may use SEND verbs to transfer data or instructions to the first APPC program. The first APPC program responds to SEND verbs with RECEIVE verbs.

The simple conversation discussed above is merely meant to illustrate the conversatorial nature of APPC program use. The illustrative example used only the most mundane verbs; in use, as those skilled in the art will know, APPC programs use many verbs to communicate between application programs and, during a given conversation, conversation control may pass numerous times from one APPC program to another.

Though the APPC protocol conceptually operates upon a number of platforms, each platform uses its own implementation of the APPC protocol and each implementation of the APPC protocol uses its own set of verbs and verb parameters, e.g., an APPC program for an MVS operating system (APPC/MVS) differs from an APPC program for an OS/2 operating system (APPC/OS/2). As such, although verbs used by the APPC programs on different platforms may be identical in spelling, these same verbs may accomplish two completely different tasks on their respective platforms. Moreover, verbs with different spellings may perform the same task on their respective platforms. Furthermore, similar verbs on different platforms may require a different number of parameters to perform their particular functions correctly on their respective platforms.

As a result of these differences amongst platform specific versions of the APPC protocol, generating transaction programs which execute on different platforms and which are capable of communicating with one another is very difficult and time consuming for even the most skilled programmer. Presently in the art, each transaction program must be designed for use in conjunction with a specific platform. Additionally, such transaction programs are not transportable to other platforms because the verbs will, in all likelihood, be misunderstood by those other platforms.

Thus, a need exists in the art for apparatus and concomitant methods for automatically generating APPC programs that are compatible with various programming languages and various types of platforms.

SUMMARY OF THE INVENTION

My invention advantageously overcomes the disadvantages heretofore associated with the development of advanced program-to-program communications (APPC) programs for use on various different platforms in a computer network. Specifically, my invention is a method and apparatus that automatically generates, from a given APPC program, compatible APPC programs for operation upon various different computing platforms. Importantly, the newly generated APPC programs are able to communicate with the given APPC program.

In particular, my invention is a method and apparatus for automatically assessing the communication capability of two pre-existing APPC programs. The method involves comparing two pre-existing APPC programs, determining errors in each program that would inhibit accurate communication between the programs, and resolving those errors. The comparison step is accomplished by comparing conversant functions and verbs contained in each program and ensuring that the functions and verbs contained in one APPC program have responsive functions and verbs contained in a second APPC program. If non-responsive functions are found or responsive functions do not exist, then my invention prompts a user with suggestions for correction of these errors.

Furthermore, if only one pre-existing APPC program is available, my inventive method and apparatus generates a second APPC program that is fully conversant with the pre-existing program. My invention accomplishes such program generation making appropriate function and verb suggestions to a user via a computer terminal. Using a step-by-step process, the user selects, from a menu, appropriate verbs and functions that will ultimately produce a conversant counterpart APPC program to the pre-existing APPC program. The appropriateness of the verbs and functions is defined by a user selected platform and operating system with which the newly formed APPC program will operate. The selected verbs and functions form a skeletal program that is subsequently compiled into an executable APPC program.

BRIEF DESCRIPTION OF THE DRAWINGS

The teachings of the present invention can be readily understood by considering the following detailed description in conjunction with the accompanying drawings, in which:

FIG. 7 depicts the proper arrangement of FIGS. 7A and 7B;

FIG. 12 depicts a proper arrangement of FIGS. 12A and 12B;

FIGS. 12A and 12B collectively depict a flow chart of RESPONSE VERB PROCESSING ROUTINE 1200 as executed upon computer system 300 shown in FIG. 3;

To facilitate understanding, identical reference numerals have been used, where possible, to designate identical elements that are common to the figures.

DETAILED DESCRIPTION

To aid in understanding my invention, the following discussion reviews the rudiments of distributed computing. Specifically, I will first discuss a distributed computer system that utilizes APPC programming techniques to facilitate communications between application programs executing on individual nodes of a network of computers. Thereafter, I will discuss my inventive apparatus and method for assisting in development of APPC programs.

Figure 1:
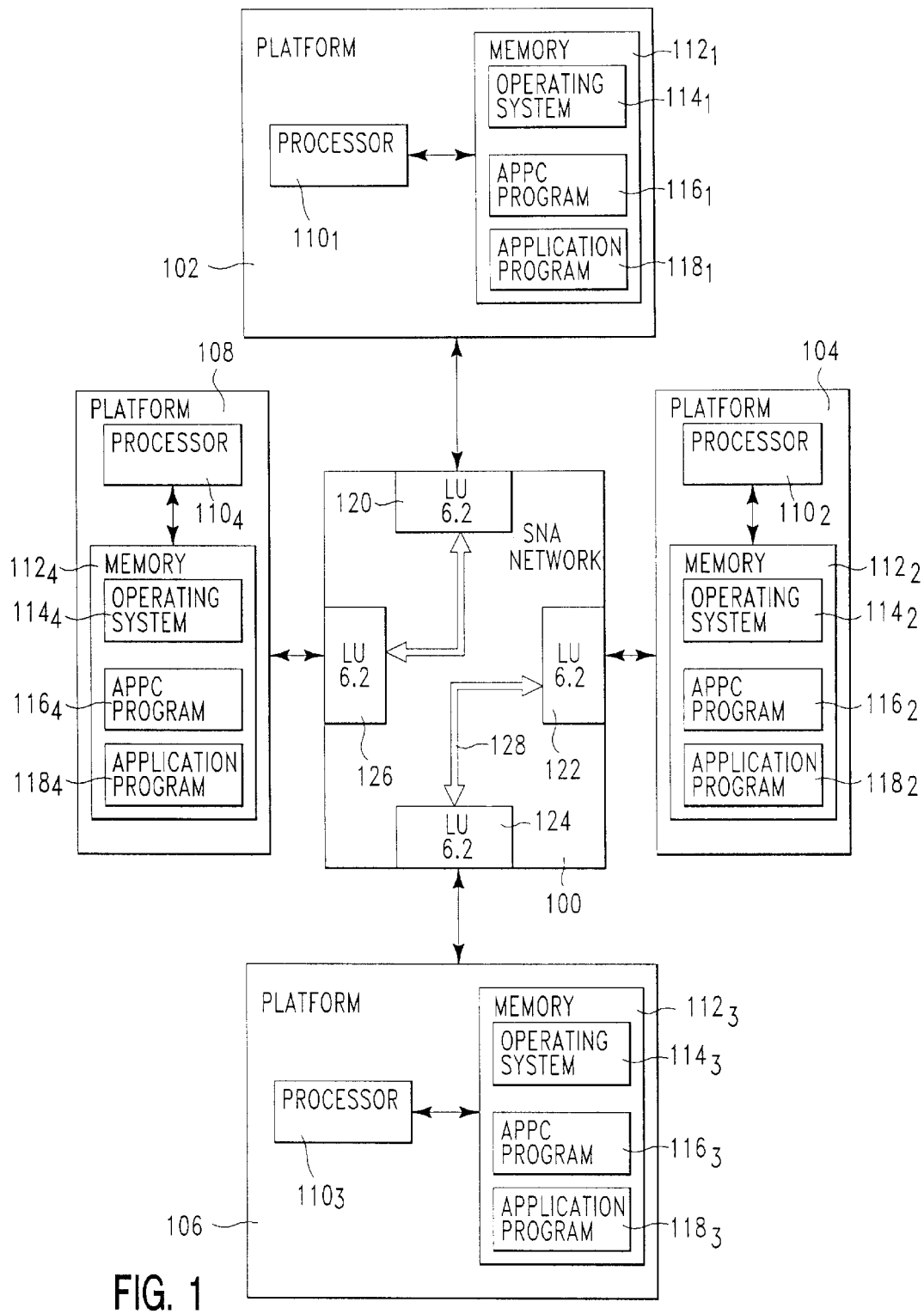
FIG. 1 depicts a block diagram of systems network architecture (SNA) network 100 supporting network communications amongst a number of platforms 102, 104, 106 and 108.

Background—Distributed Computing Using APPC FIG. 1 depicts a block diagram of systems network architecture (SNA) network 100 supporting network communications amongst a number of platforms 102, 104, 106 and 108. Platforms connected to the SNA network and using the APPC protocol may be mainframe computers, workstations, personal computers and the like. Specifically, each of the platforms 102, 104, 106 and 108 connected to the network respectively contains a processor (shown as $110_1$, $110_2$, $110_3$ or $110_4$) and a memory (shown as $112_1$, $112_2$, $112_3$ or $112_4$).

In general, each of the memories $112_1$, $112_2$, $112_3$ and $112_4$ respectively contains an operating system (shown as $1141$, $114_2$, $114_3$ or $114_4$), an advanced program-to-program communication (APPC) program (shown as $116_1$, $116_2$, $116_3$ or $116_4$), and one or more application programs (shown as $118_1$, $118_2$, $118_3$ or $118_4$).

To facilitate communication amongst application programs executing on individual platforms connected to the network, each platform connects to the network via a logical unit (LU). For example, LUs 120, 122, 124 and 126 respectively connect platforms 102, 104, 106 and 108 to network 100. To provide communications between application programs, each LU provides a common communication protocol. This protocol is interchangeably referred to as either the LU 6.2 protocol or the APPC protocol and is well known in the art. For example, LU 6.2 produces communication path 128 between platforms 104 and 106. As such and by virtue of path 128, application programs $118_2$ and $118_3$, respectively executing within platforms 104 and 106 may share data during their execution.

Figure 2:
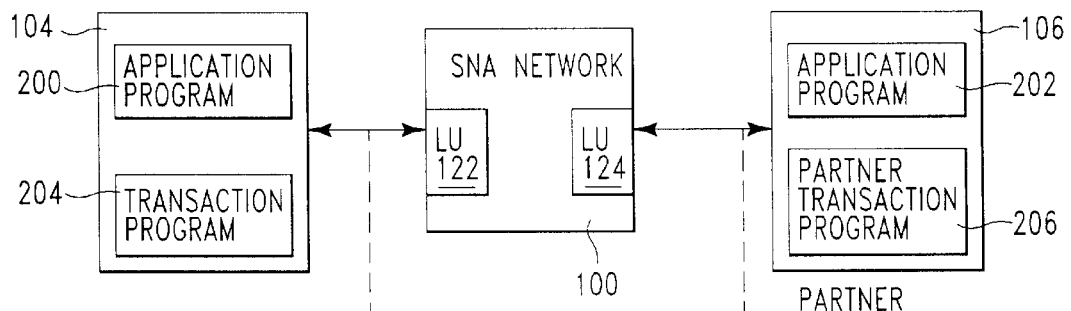
FIG. 2 depicts a typical "conversation" using the advanced program-to-program communication (APPC) protocol between two application programs 200 and 202 executing on two different platforms 104 and 106.

FIG. 2 depicts a typical "conversation" which could occur between two applications programs 200 and 202 using the APPC protocol to facilitate the conversation. These two applications programs are illustratively executing on two different platforms, e.g., platforms 104 and 106, originally shown in FIG. 1. Application programs 200 and 202 respectively connect to network 100 via LU 122 and LU 124. As is well known in the art, the APPC protocol does not require the platforms connected to the network to contain the same type of processor, nor do the application programs need to be written in the same programming language. Each LU associated with the platform provides the appropriate language translation services to facilitate exchange of information between different platforms and programming languages.

In operation, application program 200 executes on platform 104. At some arbitrary point within the program, the program may need to send information (data) to application program 202. Typically, application program 202, executing on platform 106, processes the information from application program 200 and uses results of the processing for its own purposes.

To transfer data from program 200 to program 202, a communications subroutine, i.e., a callable service of the APPC protocol, is utilized by each of the application programs. The so-called "conversation" between the programs occurs via "verbs". Generally, these so-called "verbs" are special instructions that enable the application programs to communicate. The specific arrangement of verbs within a callable subroutine forms a transaction program. A simple conversation using transaction programs for transferring data from program 200 to program 202 is shown in FIG. 2. The specific verbs used in this particular conversation are those required when the conversation occurs between platforms running MVS operating systems. Additionally, comments are annotated within the figure to provide the reader with a better understanding of the function of each verb.

In general, the conversation occurs between two programs; namely, transaction program 204 and partner transaction program 206. The illustrative conversation transfers data from one application program to another. Specifically, transaction program 204 initiates the conversation, sends data from application program 200 to application 202, and ends the conversation. Partner transaction program 206 accepts the conversation, receives the data, and ends when the conversation is ended by transaction program 204.

More specifically, transaction program 204 first initializes the conversation by sending a CMINIT verb to the network. Associated with this verb are specific verb parameters which inform the network of certain characteristics of the platform requesting to communicate. The specific nature of these parameters are well known in the art and irrelevant for the present discussion. The network responds to the CMINIT verb with an OK, thus indicating that the logical unit associated with program 202 has been initialized and is now in the proper state for receiving a communication. Subsequently, program 200 sends a CMALLC verb which requests that a conversation be allocated to a specific application program on a specific platform. In this instance, that application program is program 202 executing on platform 104. The network establishes a communications path between the applications programs, i.e., begins what is known as a "session". Application program 202 uses partner transaction program 206 to communicate with transaction program 204. After sending the CMALLC verb, transaction program 204 then sends a CMSEND verb followed by the data to be sent to program 202. If program 202 is not presently executing, LU 124 remotely invokes execution of application program 202 and partner transaction program 206 by platform 106. Upon execution, partner transaction program 206 first sends a CMACCP verb which indicates to the network that application program 202 will accept a conversation from application program 200, i.e., that LU 124 is in a "receive" state and partner transaction program 206 has understood the allocate verb. The network responds with OK. After partner transaction program 206 receives the CMSEND verb, partner transaction program 206 sends a CMRCV verb which indicates that application program 202 is ready to receive the data. Thereafter, the network forwards the data to application program 202 and transaction program 204 issues a CMDEAL verb which deallocates the conversation. Reception of a deallocation verb informs partner transaction program 206 that the conversation with transaction program 204 has ended. Program 206 sends a CMRCV verb to the network to receive any further data or instructions. At this time, the network passes a deallocate token to program 206 indicating that program 204 has deallocated the conversation. Thereafter, the network ends the conversation between the two application programs.

The foregoing simple example provides an understanding of the process involved in sending data from one program to another using APPC programs within a network environment. For simplicity, the example assumed that the same type of operating system and processor executed both programs 200 and 202. Additionally, it was assumed that programs 200 and 202 were written in the same programming language. However, typically, the processors, operating systems and programming languages are different. As such, the verbs and parameters used by each program are different. Therefore, to develop programs for distributed computing using a network such as an SNA network, the programs must be individually written. Specifically, the portion of each program which provides the communication link, i.e., the APPC program, must be written and tested for each program.

APPC Assist

My invention assists in developing APPC programs for use as callable routines from, or imbedded routines within, application programs. Specifically, after a software engineer or computer scientist develops an APPC program, e.g., a transaction program, my invention automatically produces the corresponding computer code for a partner transaction program. By informing my invention of the platform, operating system and programming language used to write a given transaction program and the platform, operating system and programming language required for the partner transaction program, my invention automatically generates the corresponding code for an appropriate partner transaction program.

Additionally, my inventive apparatus and method enables a programmer to compare pre-existing transaction and partner transaction programs to determine if any transaction inconsistencies exist, e.g., whether inconsistent verbs or states would occur within a conversation between the transaction program and its partner program. A user of my invention is prompted as to any inconsistencies, and is provided suggestions to remedy those inconsistencies. Subsequently, the user can correct the inconsistencies using the suggested corrections. As a result, my invention produces two, fully conversant APPC programs.

Figure 3:
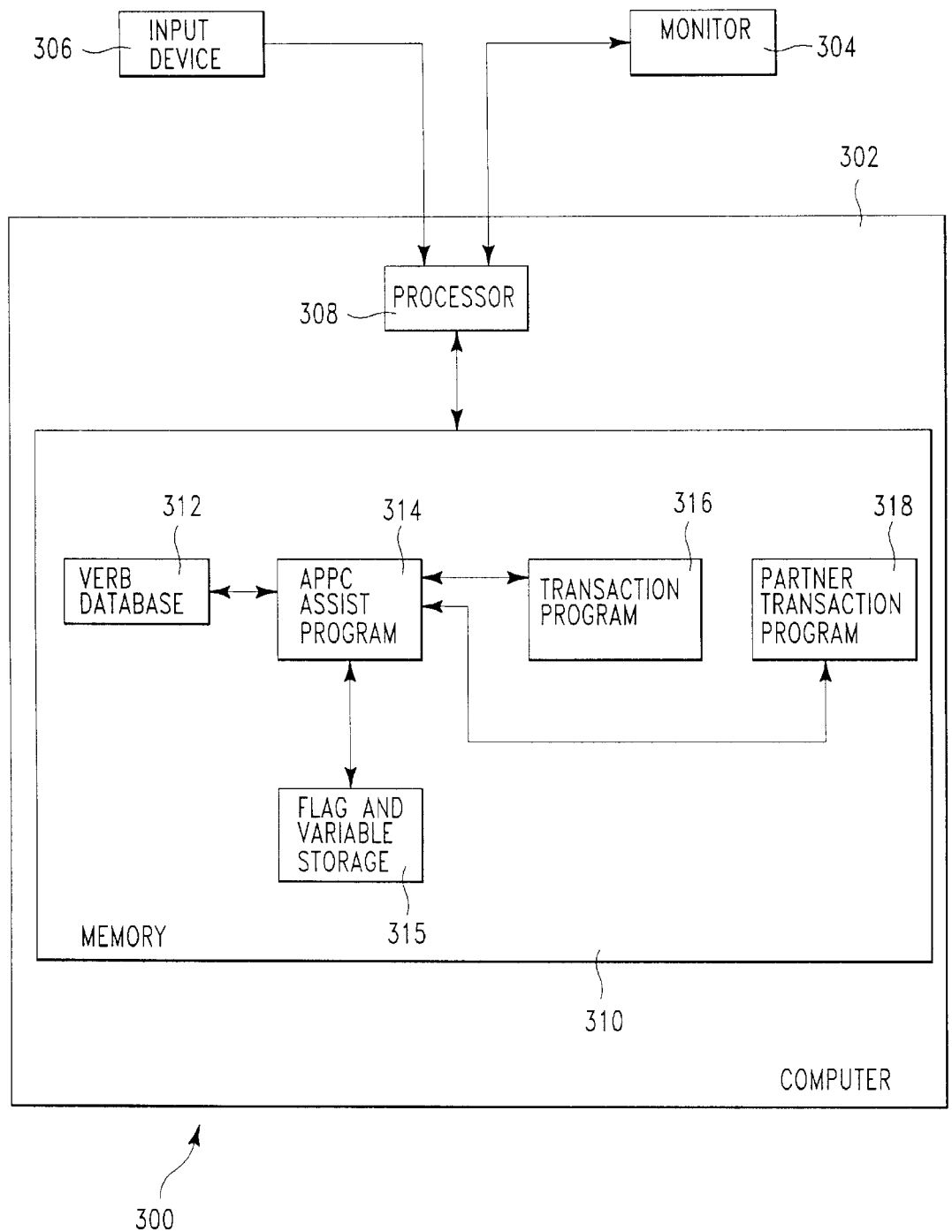
FIG. 3 depicts computer system 300 in which my invention is embodied as APPC assist program 314.

FIG. 3 depicts computer system 300 in which my invention, generally known as an APPC assist program, operates to produce a partner transaction program from a transaction program or vice versa. In general, computer system 300 executes the APPC assist program which typically uses as an input a preexisting transaction program. From the transaction program, the APPC assist program generates a partner transaction program. Thereafter, the transaction program and its partner are compiled into appropriate computer languages for the platforms upon which each will eventually operate. Alternatively, a user of the APPC assist program may develop a transaction program from a partner transaction program.

Specifically, computer system 300 contains computer 302, monitor or display 304 and at least one input device 306 such as a keyboard. Illustratively, computer 302 is a model 3090 computer utilizing an MVS operating system. Both the 3090 computer and the MVS operating system are manufactured by International Business Machines Corporation of Armonk, N.Y. Computer 302 contains processor 308 and memory 310. Within memory 310 are stored database 312, APPC assist program 314, flag and variable storage 315 and, typically, at least one of either transaction program 316 or partner transaction program 318.

Upon initial utilization of my invention, typically, only a transaction program exists. From that existing transaction program, my invention produces the partner transaction program. Advantageously, my invention is also capable of generating a transaction program from a partner transaction program. Nonetheless, for sake of simplicity, the following discussion will focus upon producing a partner transaction program from a pre-existing transaction program. From this discussion, those skilled in the art will readily understand that my invention is capable of generating a transaction program from a partner transaction program. My invention is also capable of comparing two pre-existing APPC programs. Such a comparison ensures compatibility between the programs and provides the developer an opportunity to correct any inconsistencies in either program.

To use my invention, a programmer recalls a previously written APPC program, such as transaction program 316, from memory 310. This program could be imbedded within an application program, but, for simplicity, I will assume that the transaction program is a stand-alone routine. The programmer, using the input device, requests that processor 308 execute APPC assist program 314. The APPC assist program requests, via monitor 304, that the programmer provide, as an input variable, an operating system and type of platform that will execute the transaction program, a computer language in which the transaction program is written, an operating system and type of platform which will execute the partner transaction program and a computer language in which the partner transaction program is to be produced. For example, a user may indicate that the transaction program is written in FORTRAN and designed to execute on an AS/400 computer running an OS/400 operating system; while the user may wish to generate a partner transaction program that will also be written in FORTRAN but will execute upon a System/390 computer running an MVS operating system. This information is entered as a plurality of variables for use by the APPC assist program. From this information, the APPC assist program generates a skeletal version of partner transaction program 318, i.e., an appropriately ordered list of verbs, that is fully conversant with transaction program 316. The transaction program from which the partner transaction program is created may be in either executable form or in skeletal form. Additionally, the APPC assist program is capable of compiling both the skeletal version of a transaction program and/or its skeletal partner into fully executable code.

Also, if both a transaction program and its partner program have been previously written as either skeletal or executable programs, my invention can be used to compare the programs to ensure that they will properly interact when used upon disparate platforms. If any errors are determined during the comparison, my invention enables a user to edit either transaction program to correct the error. After the programs have been compared and prove correct, the transaction program and its partner are compiled and installed as callable routines on different platforms in an SNA network to facilitate data communication between application programs executing on their respective platforms. Alternatively, the transaction programs may be imbedded into the application programs.

The APPC assist program contains a number of routines each of which accomplish specific features of my invention. To facilitate complete understanding of those features and my invention as a whole, the following discussion is divided into sections which correspond to each routine contained in the APPC assist program.

I. MAIN ROUTINE 400

Figure 4:
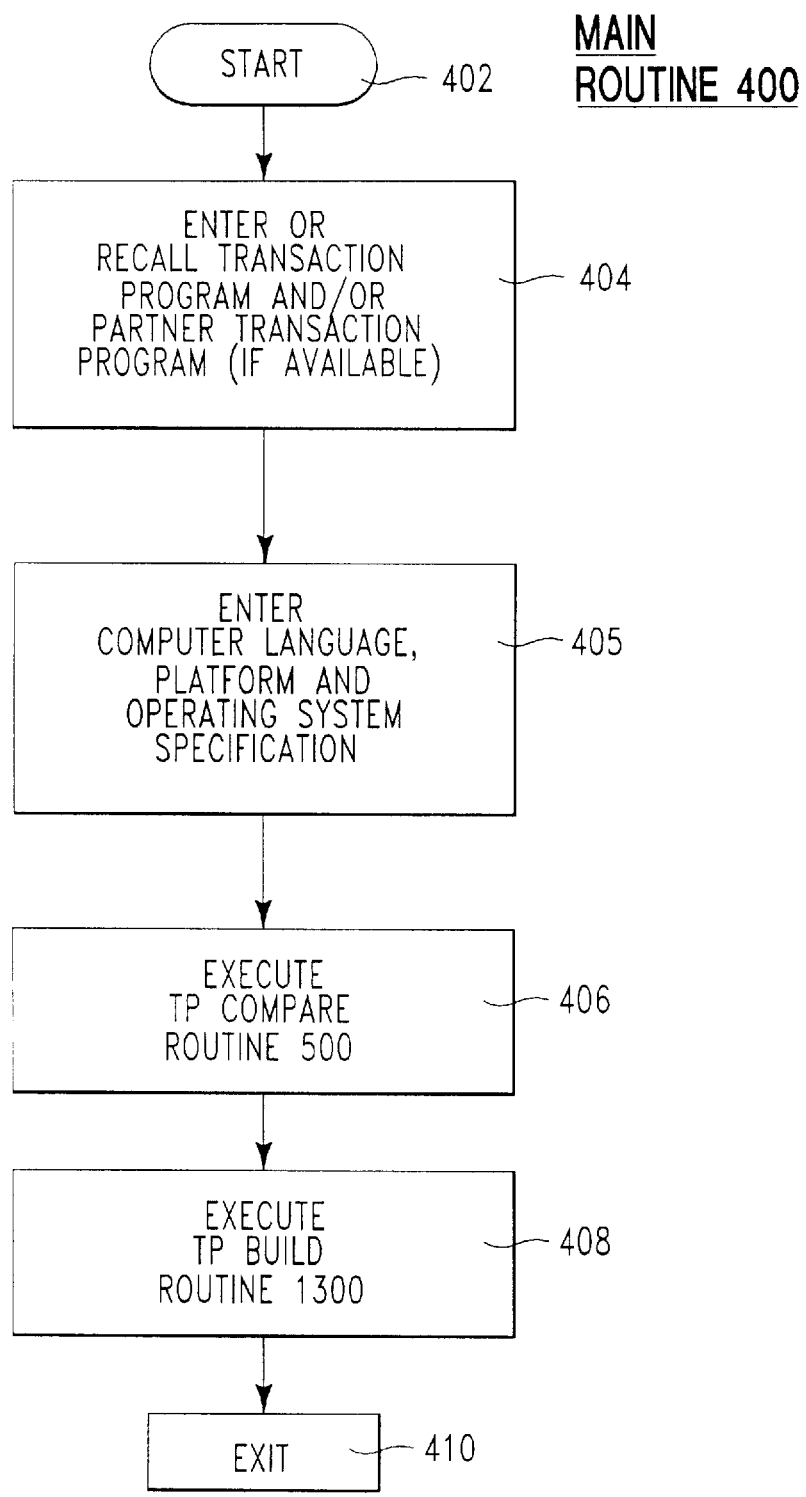
FIG. 4 depicts a flow chart of MAIN ROUTINE 400, which forms the preferred embodiment of my invention, as executed upon computer system 300 shown in FIG. 3.

FIG. 4 depicts a flow chart of MAIN ROUTINE 400 which performs each of the main features of my invention. From the MAIN ROUTINE, various other routines are sequentially executed. In general, MAIN ROUTINE 400 provides an opportunity for a user to recall a transaction program from memory. This transaction program can be either a skeletal program or an executable source program. For simplicity and unless otherwise noted, the following discussion assumes the transaction program is in skeletal form. In essence, the MAIN ROUTINE prompts a user for computer language, platform and operating system specifications for both the present transaction program and the prospective partner transaction program. Subsequently, the MAIN ROUTINE executes TP COMPARE ROUTINE 500 which, as described below in conjunction with FIG. 5, generates a skeletal partner transaction program from the transaction program. Once both a skeletal transaction program and a skeletal partner transaction program exist, the MAIN ROUTINE, as shown in FIG. 4, executes TP BUILD ROUTINE 1300 which generates a source code program for both the skeletal transaction and partner transaction programs for use in association with specific platforms and operating systems defined previously by the user.

Specifically and in operation, the MAIN ROUTINE begins at step 402 which is generally labeled "START". Through execution of step 404, a user is prompted to either enter a new transaction program line-by-line or enter a pre-existing program name to recall from memory a previously entered APPC program. In addition, if a partner transaction program is available, the partner transaction program can also be recalled at this step. Typically, a user is prompted to select, using a mouse or other pointing device, one of the various recall options from a menu.

Thereafter, upon execution of step 405, the user is prompted to enter the type of platform and operating system (s) that the transaction and partner transaction programs ultimately will be associated. Additionally, the user is prompted to select a particular computer language in which each of these two programs is to be compiled. Illustratively, these selections would also be made through user selections into a menu of options. The particular selections made by the user are stored in memory until needed by the APPC assist program to compile the transaction and/or partner transaction programs.

Next, through execution of step 406, MAIN ROUTINE 400 executes TP COMPARE ROUTINE 500 which compares the transaction program to its partner transaction program (if available) to ensure that the proper verbs are used in an appropriate order to facilitate communications between these two programs. If the partner transaction program is not available, the partner program is generated during execution of the TP COMPARE ROUTINE. If errors are found during the comparison, the user is provided an opportunity to correct any errant verbs or erroneous operational states. Once the proper verbs seem to be in the correct order within the skeletal programs, the TP COMPARE ROUTINE terminates, and execution proceeds to step 408.

Through step 408, the MAIN ROUTINE executes TP BUILD ROUTINE 1300 which attaches appropriate parameters to the verbs contained in the skeletal transaction and partner transaction programs. Thereafter, the TP BUILD ROUTINE generates source code for both programs from the verbs and parameters. The source code is completely compatible with the hardware and operating system previously selected during step 405. Hence, the resulting source code for each such program will exist in a specified computer language that is generated for operation on a particular platform running a particular operating system. Thus, the transaction program and its partner are ready for installation on their respective platforms. Lastly, the MAIN ROUTINE exits at step 410.

A. TP COMPARE ROUTINE 500

In general, TP COMPARE ROUTINE 500 compares a transaction program to its partner transaction program to verify that a conversation can be initiated and sustained between the two programs, i.e., to verify that the verbs in each program are appropriately ordered. To facilitate such verification, routine 500 searches a transaction program for verbs and, for each verb found in the transaction program, searches for a corresponding verb in the partner transaction program. If the wrong verb is found to correspond or no corresponding verb is found (i.e., no partner transaction program exists), the routine suggests to the user a possible solution, e.g., a menu of verbs, each of which would be an appropriate response to the verb found in the transaction program. In this manner, if a partner transaction program does not exist, the ROUTINE allows the user to build the partner through menu selection of suitable verbs as the transaction program is processed verb-by-verb.

In some instances, groups of verbs, rather than singular verbs, perform particular conversational functions. In this case, a group of n verbs may form a single function in the transaction or partner transaction program. As such, a transaction program receiving the multi-verb function must contain a verb or verbs that correspond to those verbs contained in the multi-verb function. However, for example, a corresponding verb will not appear in the partner program for each individual verb in the transaction program: rather, a single verb in the partner transaction program may correspond to a plurality of verbs forming a function in the transaction program or vice versa. To avoid an error occurring, the partner transaction program must contain a corresponding function as well as a corresponding verb. Consequently, TP COMPARE ROUTINE 500 searches for functions within each program, checks to ensure that all the verbs necessary to implement that function are contained therein, and then searches for a corresponding function in the partner transaction program. If a corresponding function is found, the TP COMPARE ROUTINE ensures that the proper verbs are contained therein to respond to the function in the transaction program. Of course, if the function is not found in the partner program, the TP COMPARE ROUTINE suggests the appropriate function for the partner program and allows the user to select the verbs to include in this program. As such, the TP COMPARE ROUTINE builds the partner transaction program from an existing transaction program.

To facilitate communications between a transaction program and its partner, in addition to containing corresponding verbs, the transaction program and its partner must each set its corresponding logical unit in an appropriate state for implementation of the present verb or function. Under the APPC protocol, a logical unit can be set to one of eight states including: receive, send, confirm, reset, defer, synchronize, backout and deallocate. Table 1 summarizes which verbs can be used during each state. The table contains an illustrative sample of the many verbs available for use in a typical conversation. A "Y" in the state column indicates a required or "legal" state of the LU for that particular verb. An empty cell indicates an improper or "illegal" state for that verb.

TABLE 1

Required LU state for each verb

| | CONVERSATION STATES | | | | | | | |
|---|---|---|---|---|---|---|---|---|
| VERBS | RESET | SEND | DEFER | RE-CEIVE | CON-FIRM | SYNC | BACK-OUT | DE-AL |
| ALLOCATE | Y | | | | | | | |
| CONFIRM | | Y | Y | | | | | |
| CONFIRMED | | | | | Y | | | |
| DEALLOCATE | | | | | | | | Y |
| FLUSH | | Y | Y | | | | | |
| GET ATTRIBUTES | | Y | Y | Y | Y | Y | Y | Y |

TABLE 1-continued

Required LU state for each verb

CONVERSATION STATES

| VERBS | RESET | SEND | DEFER | RECEIVE | CONFIRM | SYNC | BACKOUT | DE-AL |
|---|---|---|---|---|---|---|---|---|
| POST ON RECEIPT | | | | Y | | | | |
| PREPARE TO RECEIVE | | Y | | | | | | |
| RECEIVE AND WAIT | | Y | | Y | | | | |
| RECEIVE IMMEDIATE | | | | Y | | | | |
| REQUEST TO SEND | | | | Y | Y | Y | | |
| SEND DATA | | Y | | | | | | |
| SEND ERROR | | Y | | Y | Y | Y | | |
| BACKOUT | | Y | Y | Y | Y | Y | Y | |
| GET TYPE | | Y | Y | Y | Y | Y | Y | Y |
| SYNCPT | | Y | Y | | | Y | | |
| WAIT | | | | Y | | | | |

Typically, either the verb alone or the parameters associated with each verb control the state of the logical unit. For example, the mere occurrence of an ALLOCATE verb changes the state from "reset" to "send". Alternatively, for other verbs, the parameters associated therewith place a logical unit in one of many legal states.

Additionally, the parameters of a particular verb may change the state of a logical unit while that verb is being acted upon by the recipient APPC program. In other instances, a given verb may change the state of a logical unit for any verbs which follow that given verb. During a conversation the state of the logical unit may change many times. For this reason, my invention establishes a state variable (STATE) to maintain track of the state which the logical unit would be in if the transaction program or partner transaction program were actually being executed. As such, my invention can ensure that a particular verb is used while the state of the logical unit is appropriate for that verb. If, by chance, a verb is used during an inappropriate state, an error is recognized by the TP COMPARE ROUTINE and the user is prompted to correct the error.

The ultimate output of the TP COMPARE ROUTINE is a skeletal transaction program and a skeletal partner transaction program. Such skeletal programs are not executable. They merely contain a list of verbs in an appropriate order to facilitate a particular conversation between the programs.

Figure 5:
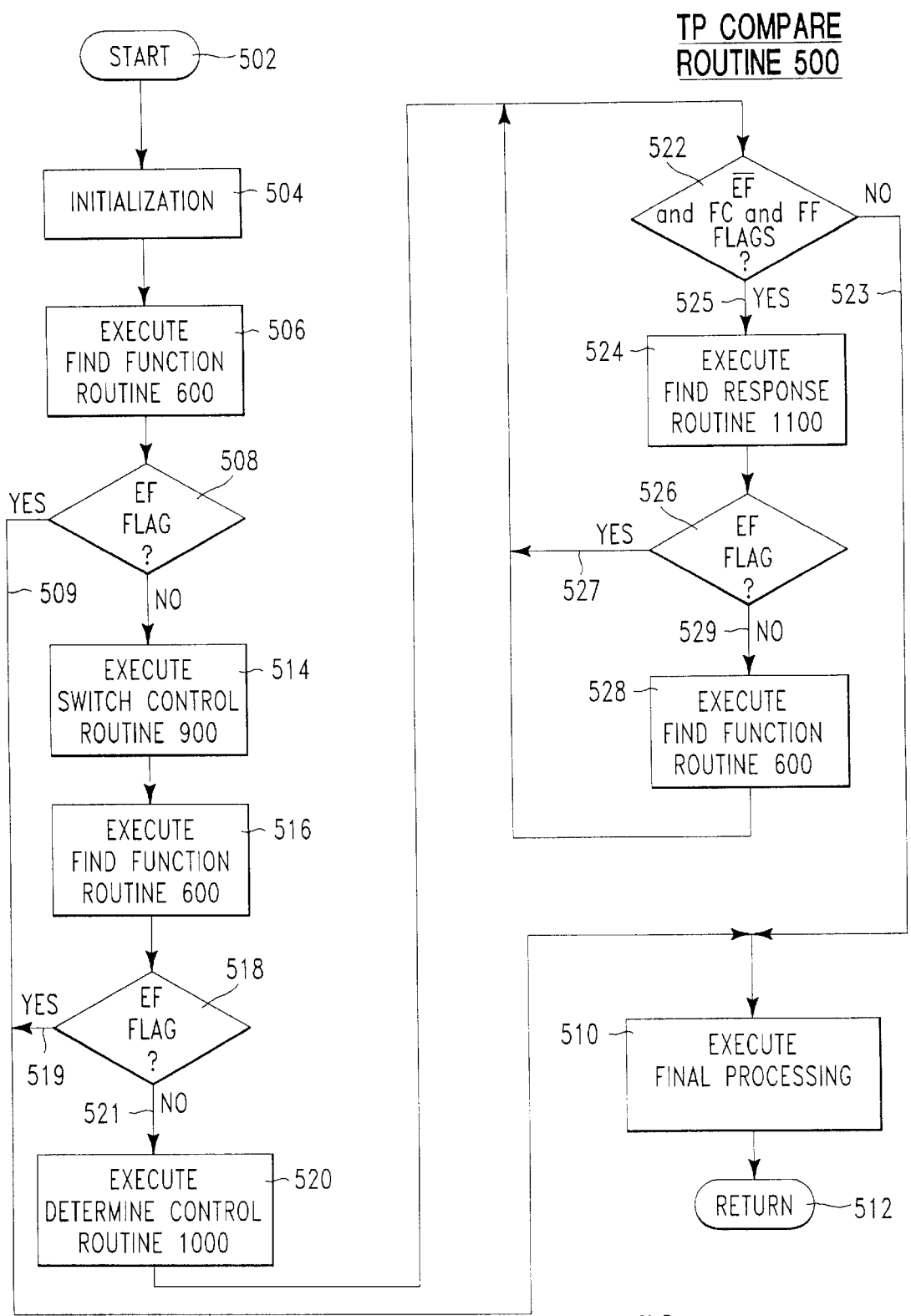
FIG. 5 depicts a flow chart of TP COMPARE ROUTINE 500 as executed upon computer system 300 shown in FIG. 3.

FIG. 5 depicts a flow chart of TP COMPARE ROUTINE 500. As described above, the program that initiates the conversation is initially referred to as the transaction program. However, as a conversation progresses, control of the conversation passes from one transaction program to another. The program that is controlling the conversation, i.e., the program that is presently "talking", is always referred to as the transaction program while the program that is subordinate, i.e., the program that is presently "listening", is referred to as the partner transaction program. Thus, during a given conversation, the term "transaction program" is used in association with either program involved in the conversation depending upon the present conversational scenario, i.e., depending upon which program is presently "talking". Consequently, to properly determine which verb or function is appropriate in the context of the present conversation, ROUTINE 500 must maintain track of which program is presently controlling the conversation.

Initially, TP COMPARE ROUTINE 500 does not know which program (if two exist) is the controlling program. Therefore, ROUTINE 500 first arbitrarily selects and then searches the selected program for the first function in that program. Then, ROUTINE 500 switches conversation control to the other program and searches that program for the first function therein. By comparing the first functions to each other, ROUTINE 500 determines which of the two programs is initially in control of the conversation. Alternatively, if one of the two programs is non-existent, ROUTINE 500 determines whether the existing program is initially in control of the conversation or not.

After the controlling program is determined, ROUTINE 500 alternately searches each program to find functions and verbs which correspond to one another. For example, if two programs (first and second) are processed by ROUTINE 500 and the first program is found to be the controlling program; then, the second program is searched for an appropriate responsive function and verbs to the first function of the first program. Subsequently, the first program is searched for a responsive function to the next function contained in the second program. This process of comparing the functions contained in the programs continues until the end of each program is reached. If, during the comparison process, an error is detected, the user is provided an opportunity to correct the error. If the error is not corrected, ROUTINE 500 is exited.

Alternatively, if only one program exists, the user is prompted to select responsive verbs to those contained in the existing program. As such, a second program is developed from the existing first program.

Specifically, TP COMPARE ROUTINE 500 begins at "start" block 502 which is executed by the MAIN ROUTINE. Through step 504, ROUTINE 500 initializes various variables and flags used throughout ROUTINE 500. The various flags and variables are respectively summarized in TABLE 2 and 3 below.

TABLE 2

Variables used in TP COMPARE ROUTINE 500

| VARIABLE | DEFINITION |
| --- | --- |
| FUNC | The present or last function implemented by the transaction program |
| STATE | The present or last state in which the transaction program placed the logical unit associated with that transaction program |

TABLE 3

Flags used in TP COMPARE ROUTINE 500

| FLAG | DEFINITION |
| --- | --- |
| FF | Function found flag -- indicates that a function was found in the transaction program the last time the TP COMPARE ROUTINE was executed |
| VP | Verb processed flag -- indicates that a verb has been processed |
| FC | Function complete flag -- indicates that a complete set of verbs that comprise a function were found in the transaction program |
| EF | Error found flag -- indicates that an error has been found in the transaction program |
| DF | Deallocate flag -- indicates that the present or last function processed will end (deallocate) the conversation |
| SF | Send flag -- indicates that the present or last function causes control of the conversation to change to the transaction program that is not presently in control |
| CF | Confirmed flag -- indicates that the present or last function involves a confirmation action |
| SE | Send error flag -- indicates that the present or last verb was a send error verb |
| DT | Data flag -- indicates that the present or last function involves data transfer between transaction programs |
| PE | Partner empty flag -- indicates that there are no more functions contained in the partner transaction program |

The foregoing flags and variables are those set by the transaction program, i.e., the program in control of the conversation. The flags and variables set by the partner transaction program are the same as those set by the transaction program. However, to alleviate confusion, the variables and flags set by the partner transaction program are prefixed with a "P" throughout the remainder of this discussion. For example, the function found flag (FF) set by a partner transaction program is identified hereinafter as "PFF".

After initialization of the flags and variables, ROUTINE 500 proceeds to step 506. At step 506, ROUTINE 500 executes FIND FUNCTION ROUTINE 600 (which is depicted in detail in FIG. 6 and discussed in conjunction therewith below) which searches a previously recalled transaction program for a function. In general, the FIND FUNCTION ROUTINE searches the transaction program for the first verb in the program. This verb marks the beginning of a first function in the program. The FIND FUNCTION ROUTINE analyzes all the verbs that comprise the first function. During execution of the FIND FUNCTION ROUTINE, this ROUTINE enables a number of flags to indicate various outcomes of the processing. For example, when the FIND FUNCTION ROUTINE analyzes a complete function, a function complete (FC) flag is set. Also, if a verb is not found or an inappropriate verb is found, an error found (EF) flag is set. Whenever an error found flag is set, an error identification number is stored such that the type of error that occurred can be subsequently analyzed and corrected (if possible). The error correction is accomplished within the FIND FUNCTION ROUTINE; therefore, any set error found flags which remain after the FIND FUNCTION ROUTINE returns to the TP COMPARE ROUTINE indicate an error that can not be corrected by this routine.

At step 508, the TP COMPARE ROUTINE checks the status of the error found (EF) flag that may have been set and not corrected during execution of the FIND FUNCTION ROUTINE. If the error found flag has been set, the TP COMPARE ROUTINE proceeds to step 510, via YES path 509, wherein final processing is executed. Final processing accomplishes conventional "house cleaning" tasks such as closing files, clearing buffers and the like before the TP COMPARE ROUTINE returns, at step 512, to the MAIN ROUTINE.

If, at step 508, the error found flag is not found to be set, the TP COMPARE ROUTINE continues, along NO path 511, to step 514. At step 514, ROUTINE 500 executes ROUTINE 900 for switching control of the conversation to the other transaction program (partner). Such a switch in control permits the FIND FUNCTION ROUTINE to be applied to the other transaction program as the routine was to the present transaction program. To facilitate the change or switch in conversation control, at step 514, ROUTINE 500 executes SWITCH CONTROL ROUTINE 900. The SWITCH CONTROL ROUTINE stores in memory the present flags and variable values associated with the transaction program upon which the FIND FUNCTION ROUTINE at step 506 had just operated. Then the SWITCH CONTROL ROUTINE recalls flags and variable values (if any) for the partner transaction program. Consequently, the program that was the transaction program becomes the partner transaction program and vice versa. In other words, the APPC program that previously was the partner transaction program is now controlling the conversation, and consequently, becomes the transaction program through execution of SWITCH CONTROL ROUTINE 900.

Once control is switched to what was the partner program, at step 516, FIND FUNCTION ROUTINE 600 is executed to find the first function in that program. As described below, the FIND FUNCTION ROUTINE analyzes the verbs which comprise the function in the partner transaction program. Upon return to the TP COMPARE ROUTINE from the FIND FUNCTION ROUTINE, the TP COMPARE ROUTINE queries, at step 518, whether the error found flag is set. If the error found flag is set, the TP COMPARE ROUTINE proceeds along YES path 519 and executes, at step 510, the final processing routine. Alternatively, if the error found flag is not set, the TP COMPARE ROUTINE proceed along NO path 521 and executes, at step 520, DETERMINE CONTROL ROUTINE 1000.

At this point in ROUTINE 500, both transaction programs have been searched for the first function in each program and various flags and variables have been set to indicate the nature of the first function in each transaction program. From these flags and variables, the DETERMINE CONTROL ROUTINE determines which of the two transaction programs is initially controlling the conversation. This is accomplished by determining which program contains an allocate function as a first function. The DETERMINE CONTROL ROUTINE deems the initially controlling program as the transaction program and deems the other program as the partner transaction program. If, upon determining which program is initially controlling, the DETERMINE CONTROL ROUTINE must switch control of the conversation, it does so to ensure that the controlling program is the transaction program. Once the transaction program is found, TP COMPARE ROUTINE proceeds to step 522.

At step 522, TP COMPARE ROUTINE 500 queries whether an error found (EF) flag is not set, whether a function complete (FC) flag is set and whether a function found (FF) flag is set. If any of the queries are answered negatively, i.e., either an uncorrected error exists, a complete function was not found or a function was not found at all, ROUTINE 500 proceeds along NO path 523 and accomplishes, at step 510, final processing and ultimately returns to the MAIN ROUTINE. However, if all three queries at step 522 are affirmatively answered, i.e., no uncorrected errors then exist, a complete function was found and a function was found, ROUTINE 500 continues along YES path 525 to step 524.

Figure 11:
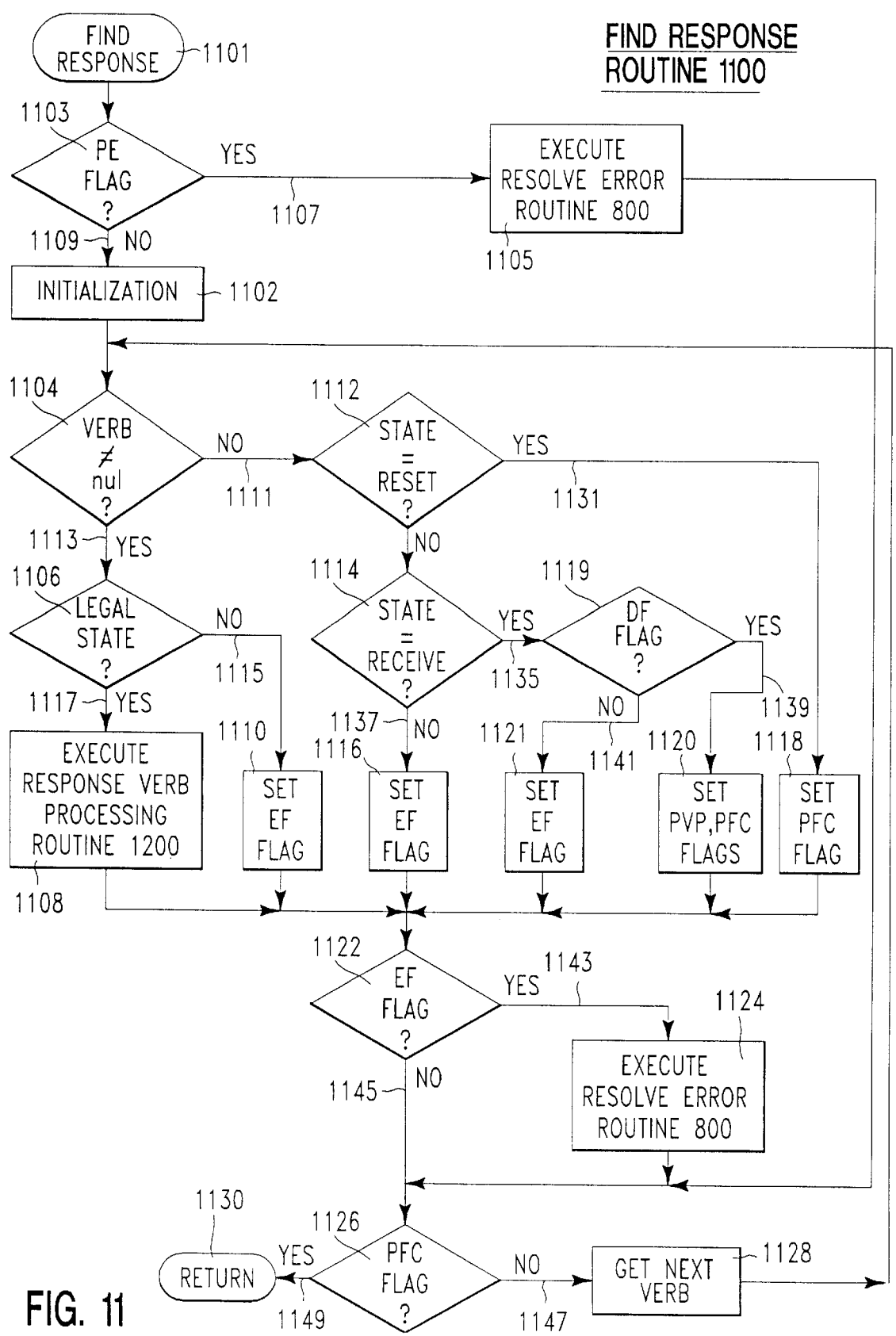
FIG. 11 depicts a flow chart of FIND RESPONSE ROUTINE 1100 as executed upon computer system 300 shown in FIG. 3.

At step 524, TP COMPARE ROUTINE 500 executes FIND RESPONSE ROUTINE 1100 (which is depicted in FIG. 11 and discussed in conjunction therewith below). ROUTINE 1100, in essence, performs a similar function as that of FIND FUNCTION ROUTINE 600. Specifically, ROUTINE 1100 analyzes the next function in the partner transaction program to ensure that the function appropriately responds to the previous function executed by the transaction program. As the analysis proceeds various flags and variables are set as necessary.

Upon return from ROUTINE 1100, TP COMPARE ROUTINE 500 queries, at step 526, whether an error found flag has been set and not corrected within the FIND RESPONSE ROUTINE. If the error found flag is set, ROUTINE 500 returns along YES path 527 to step 522. At step 522, if the query is answered negatively because the error flag is set, the process proceeds to step 510. Ultimately, ROUTINE 500 returns to the MAIN ROUTINE via steps 510 and 512. However, if the error flag is not set, ROUTINE 500 proceeds along NO path 529 to step 528.

At step 528, ROUTINE 500 again executes FIND FUNCTION ROUTINE 600 as described above. The FIND FUNCTION ROUTINE now searches for the second function in the transaction program. The loop represented by steps 522, 524, 526, and 528 is repeated until all the functions and their respective responses have been analyzed in both the transaction and partner transaction programs. The loop is exited, via NO path 523 emanating from decision step 522, when either the error found flag is set and not corrected, a function complete flag is not set or a function found flag is not set. Not finding another function, i.e., the function found flag not being set, indicates that the end of the transaction program has been reached. Upon exiting the loop, ROUTINE 510 accomplishes final processing and, ultimately, returns, via step 512, to the MAIN ROUTINE.

1. FIND FUNCTION ROUTINE 600

As alluded to above, the FIND FUNCTION ROUTINE initially searches a transaction program for the first function in the program and analyzes the verbs contained in the first function. Thereafter, upon each subsequent execution of the FIND FUNCTION ROUTINE, the ROUTINE searches for the next function in the transaction program, i.e., the APPC program presently controlling the conversation and analyzes the verbs contained therein. The goal of this routine is to determine if the verbs in the function are appropriately ordered to accomplish the function, that the verbs occur during the proper operational state, and that the necessary verbs are present for the appropriate function.

Figure 6:
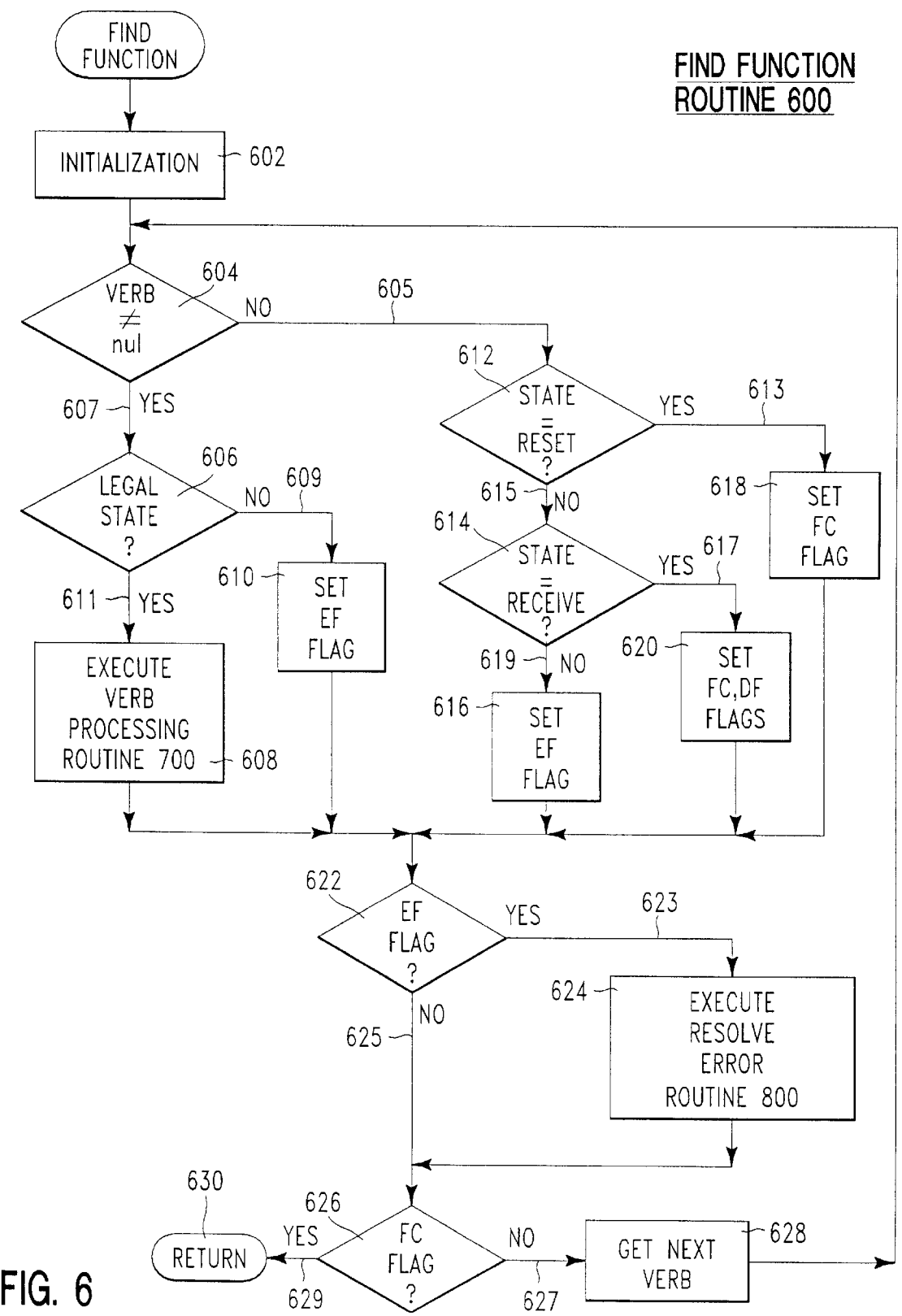
FIG. 6 depicts a flow chart of FIND FUNCTION ROUTINE 600 as executed upon computer system 300 shown in FIG. 3.

Specifically, FIG. 6 depicts a flow chart of FIND FUNCTION ROUTINE 600. At step 602, an initialization routine is executed to initialize variables, flag settings and various buffers used by ROUTINE 600. At step 604, ROUTINE 600 queries whether a verb has been found, i.e., verb≠null. If a verb is found, ROUTINE 600 proceeds along YES path 607 to step 606; otherwise, ROUTINE 600 proceeds along NO path 605 to step 612.

At step 606, ROUTINE 600 queries whether the verb has a "legal state". A legal state occurs when the logical unit through which the transaction program communicates is placed in an appropriate state for the verb presently being used. The state in which an LU would be placed during use of the transaction program in an SNA network is tracked by the state variable, STATE. At step 606, ROUTINE 600 accesses a database of verbs and their associated allowable states. TABLE 1 contains an illustrative list of verbs and their legal states. The present verb is compared to states appropriate for that verb. If the present state, i.e., the present STATE variable, matches an appropriate state for that verb, the verb is deemed to have a legal state. Otherwise, the verb is deemed to be in an illegal state. If an illegal state is indicated, ROUTINE 600 proceeds along NO path 609 and sets an error found flag at step 610. If a legal state is evident for the present verb, ROUTINE 600 proceeds along YES path 611 and executes, at step 608, VERB PROCESSING ROUTINE 700.

VERB PROCESSING ROUTINE 700 (which is depicted in FIG. 7 and discussed in conjunction therewith below) determines the specific type of verb that is presently being processed and sets various flags and variable values based upon the verb determination. Specifically, the present verb is matched to a verb contained in a list of a plurality of verbs. Once a verb match is found, that particular verb is processed in a specific manner.

If, upon attempting to match the present verb with each allowable verb, a match is not found, FIND FUNCTION ROUTINE 600 proceeds to step 622. At this step, ROUTINE 600 queries whether an error found flag was set during verb processing. If a verb match was not found, an error found (EF) flag would not be set, i.e., a verb was never processed to cause an error. As such, the answer to the query of step 622 is negative. ROUTINE 600 then proceeds along NO path 625 to step 626. At step 626, ROUTINE 600 queries whether the function complete (FC) flag is set. Since a verb has not yet been processed, the function complete (FC) flag cannot be set. As such, ROUTINE 600 proceeds along NO path 627 to step 628 wherein the next verb in the program is found.

Figures 8, 9:
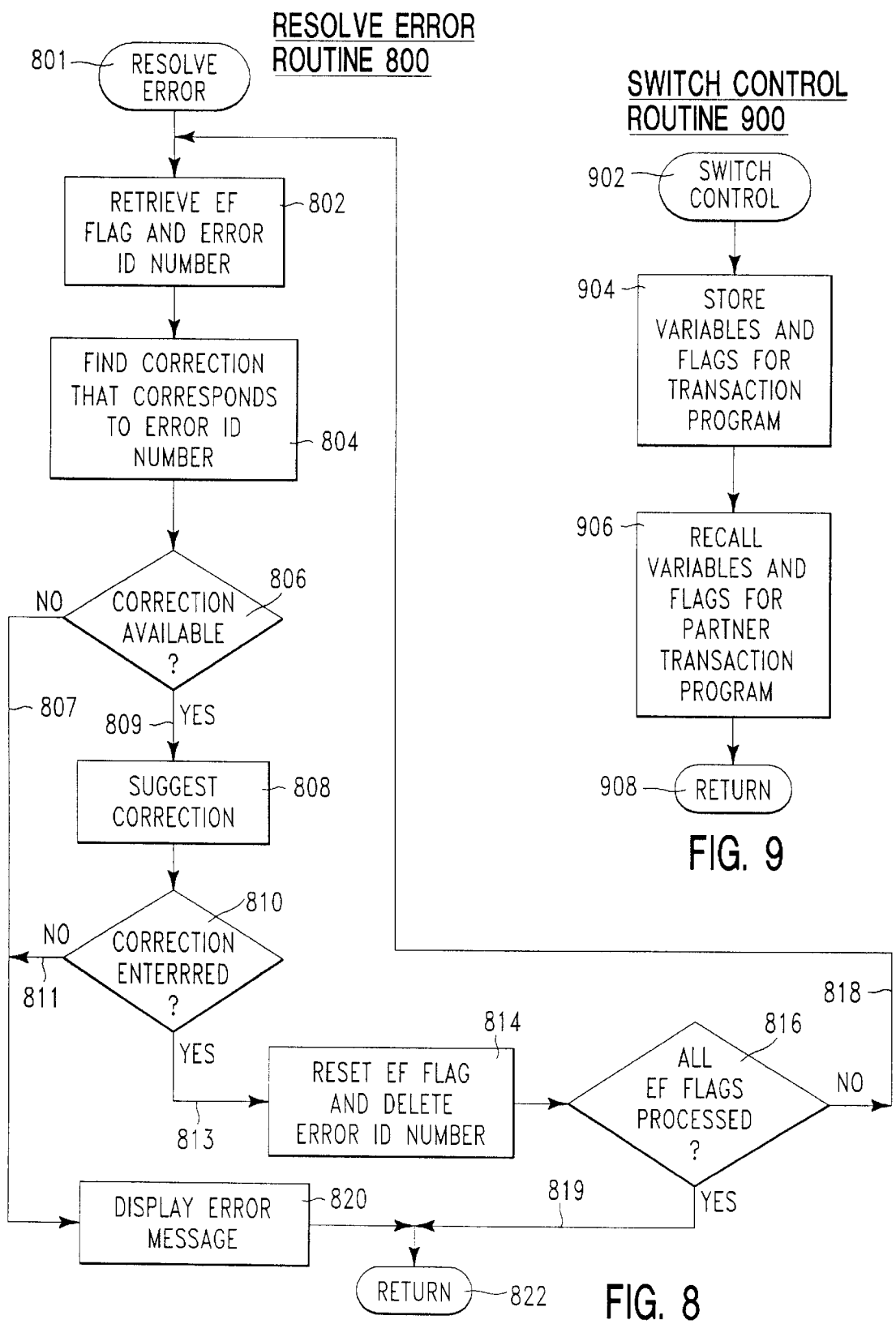
FIG. 8 depicts a flow chart of RESOLVE ERROR ROUTINE 800 as executed upon computer system 300 shown in FIG. 3.
FIG. 9 depicts a flow chart of SWITCH CONTROL ROUTINE 900 as executed upon computer system 300 shown in FIG. 3.

Returning to step 622, if a verb was processed that resulted in the error found (EF) flag being set, the query at step 622 would be answered affirmatively. In response, ROUTINE 600 proceeds along YES path 623 and executes, at step 624, RESOLVE ERROR ROUTINE 800 (which is depicted in FIG. 8 and discussed in conjunction therewith below). ROUTINE 800 identifies the error and prompts the user with a menu of suggested corrective actions. Once corrective action is selected, ROUTINE 800 returns to ROUTINE 600 at step 626.

At step 626, ROUTINE 600 queries whether the function complete (FC) flag has been set. This flag is set during verb processing when the last verb in a function is processed. If the function complete (FC) flag is not set, ROUTINE 600 proceeds along NO path 627 and retrieves, at step 628, the next verb in the function and processes that verb in the manner described above, i.e., starting at step 604. Alternatively, if the function complete flag is set, ROUTINE 600 proceeds along YES path 629 and returns, at step 630, to TP COMPARE ROUTINE 500.

Returning to step 604, if another verb is not found in the transaction program, ROUTINE 600 proceeds along NO path 605 emanating from decision step 604. At step 612, the ROUTINE queries whether the state variable is presently set to "reset". If the present state is reset, ROUTINE 600 proceeds along YES path 613 and sets the function complete (FC) flag at step 618. If the prior verb has set the state to reset, this always indicates an end of a function, thus ROUTINE 600 sets the function complete flag when the reset state is ascertained.

Alternatively, if the state variable is not set to the reset state, ROUTINE 600 proceeds along NO path 615 and queries, at step 614, whether the state variable is presently the receive state. If the state is receive, then, ROUTINE 600 proceeds along YES path 617 to step 620 wherein both the function complete and the deallocate flags are set. However, if the receive state is not set, then, ROUTINE 600 proceeds along NO path 619 to step 616 wherein the error found flag is set. Thereafter, ROUTINE 600 proceeds to step 622 and performs steps 622, 624, 626, 628 and 630 as described previously.

a. VERB PROCESSING ROUTINE 700

Figure 7A:
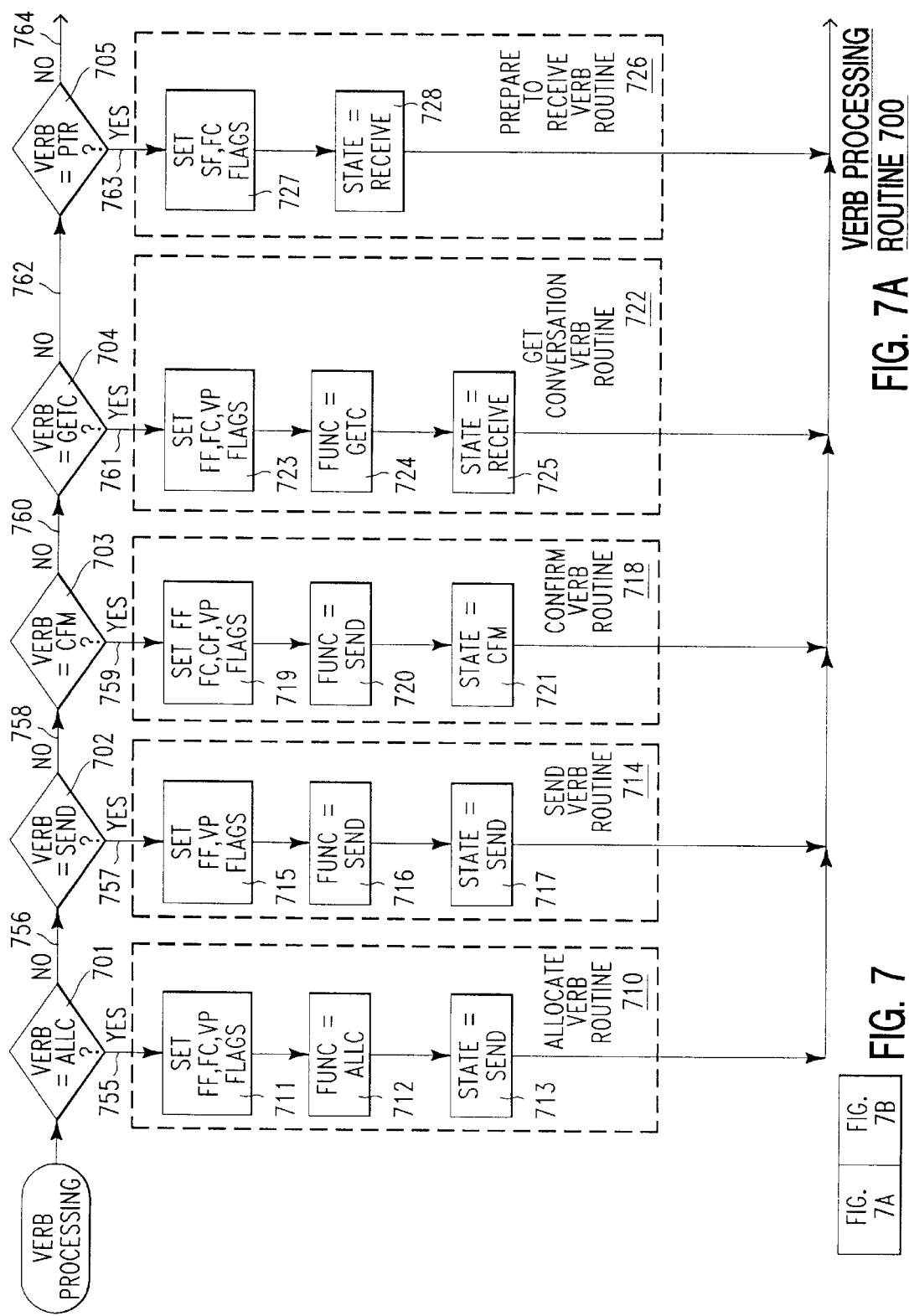
FIGS. 7A and 7B collectively depict a flow chart of VERB PROCESSING ROUTINE 700 as executed upon computer system 300 shown in FIG. 3.
Figure 7B:
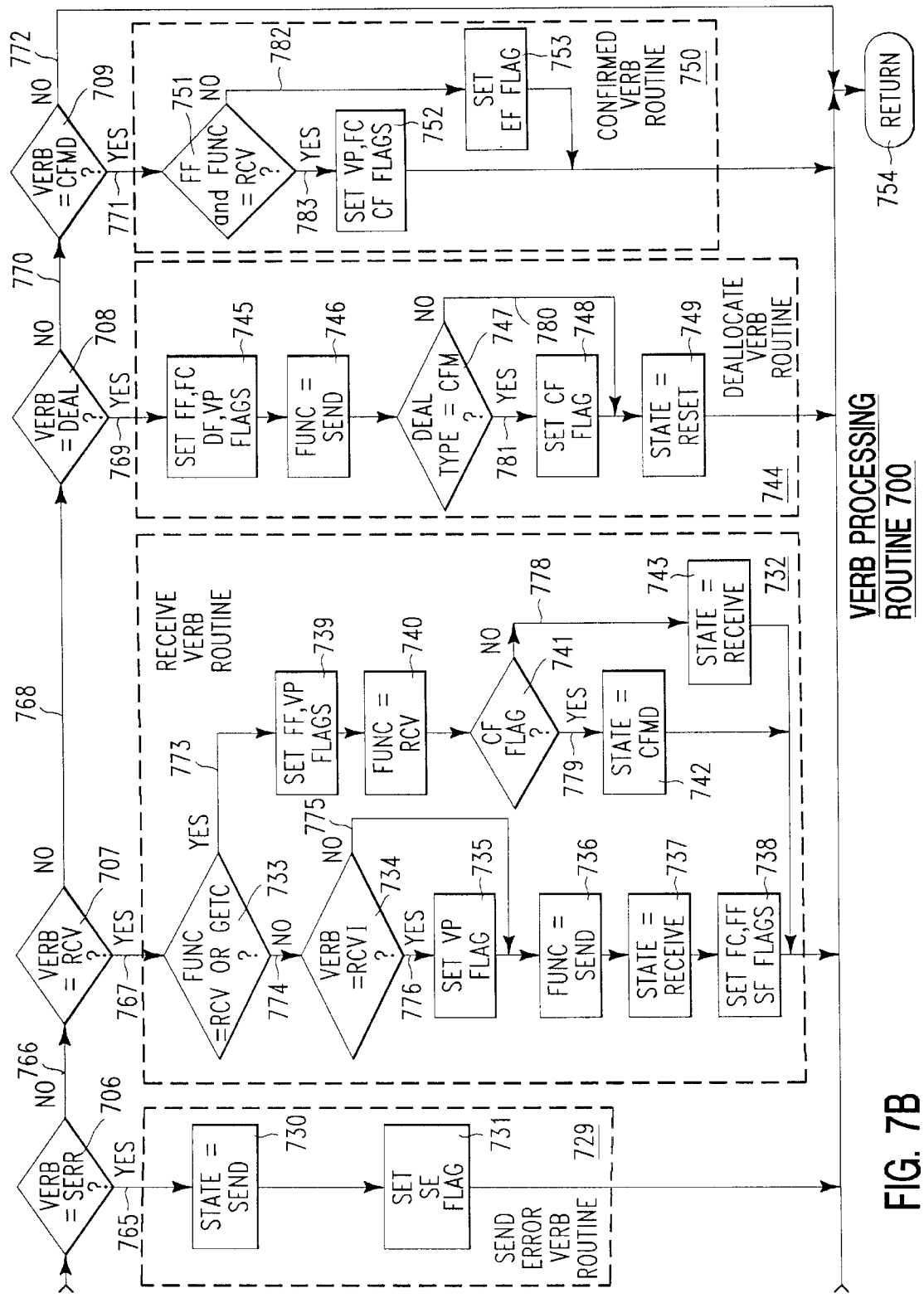

FIG. 7 depicts the proper arrangement of FIGS. 7A and 7B. Collectively, FIGS. 7A and 7B depict a flow chart of VERB PROCESSING ROUTINE 700. This routine determines what the present verb is, what function the verb is associated with and what state the verb is associated with. In response to the verb type, function and state, a number of variables and flags are set. Since there are a large number of verbs available for use in a transaction program, depicting a flow chart for sorting through all possible verbs would require an excessive number of drawings. As such, ROUTINE 700, as shown, analyzes an illustrative number of verbs. The verbs chosen for this illustrative routine are, in general, the generic verbs used by those skilled in the art in developing skeletal transaction programs.

If, however, the transaction program is executable, the verbs searched and processed in the VERB PROCESSING ROUTINE must include executable verbs. From the following discussion, those skilled in the art will realize how to expand the verb list to include executable verbs as well as the generic verbs.

Specifically, the verbs sorted by ROUTINE 700 are ALLOCATE (ALLC), SEND, CONFIRM (CFM), DEALLOCATE (DEAL), RECEIVE (RCV), CONFIRMED (CFMD), GET CONVERSATION (GETC), PREPARE TO RECEIVE (PTR) and SEND ERROR (SERR). The RECEIVE verb can be either the RECEIVE AND WAIT (RCVW) verb or the RECEIVE IMMEDIATE (RCVI) verb. Those skilled in the art will readily understand the functionality of each of these verbs. Therefore, a review of their operation and function within a transaction program is unnecessary.

In general, ROUTINE 700 sequentially queries whether the present verb matches one of the plurality of verbs listed above. Each individual query is represented by steps 701, 702, 703, 704, 705, 706, 707, 708 and 709. When a particular verb match occurs, ROUTINE 700 executes a particular verb analysis routine. For example, if the present verb is an ALLOCATE verb, query at step 701 would be answered affirmatively and ROUTINE 700 proceeds along YES path 763 to execute ALLOCATE VERB ROUTINE 710.

ALLOCATE VERB ROUTINE 710 sets, at step 711, the function found (FF) flag, the function complete (FC) flag, and the verb processed (VP) flag. The ALLOCATE verb is a function in and of itself and requires no other verbs to complete its function of initiating a conversation. Therefore, the function found flag is set to indicate a function has been found in the transaction program; the function complete flag is set because the ALLOCATE verb is a complete function; and the verb processed flag is set because the ALLOCATE verb is completely processed by the ALLOCATE VERB ROUTINE. At step 712, the function variable (FUNC) is set to allocate and, at step 713, the state variable (STATE) is set to send, i.e., the state in which an LU would be set by this verb. Upon exiting the ALLOCATE VERB ROUTINE, VERB PROCESSING ROUTINE 700 returns, via step 754, to FIND FUNCTION ROUTINE 600.

If the present verb is not an ALLOCATE verb, then ROUTINE 700 proceeds along NO path 756 to decision step 702. If a SEND verb is recognized at step 702, ROUTINE 700 proceeds along YES path 757 to step 715 within SEND VERB ROUTINE 714. At step 715, the function found flag and the verb processed flags are set to respectively indicate that a function was found and that a verb was processed by ROUTINE 700. Subsequently, at step 716, the function variable is set to send and, at step 717, the state variable is set to send. Upon exiting the SEND VERB ROUTINE, VERB PROCESSING ROUTINE 700 returns to FIND FUNCTION ROUTINE 600.

If a SEND verb was not recognized at decision step 702, ROUTINE 700 proceeds along NO path 758 to decision step 703. If a CONFIRM verb is recognized at step 703, ROUTINE 700 proceeds along YES path 759 to step 719 within CONFIRM VERB ROUTINE 718. At step 719, the function found flag, function complete flag, confirm flag and verb processed flag are each set. Additionally, at step 720, the function variable is set to send and, at step 721, the state variable is set to confirm. Upon exiting the CONFIRM VERB ROUTINE, VERB PROCESSING ROUTINE 700 returns to FIND FUNCTION ROUTINE 600.

If a CONFIRM verb was not recognized at decision step 703, ROUTINE 700 proceeds along NO path 760 to decision step 704. If a GET CONVERSATION verb is recognized at step 704, ROUTINE 700 proceeds along YES path 761 to step 723 within GET CONVERSATION VERB ROUTINE 722. At step 723, the function found flag, function complete flag and verb processed flag are each set. Additionally, at step 724, the function variable is set to get conversation and, at step 725, the state variable is set to receive. Upon exiting the GET CONVERSATION VERB ROUTINE, VERB PROCESSING ROUTINE 700 returns, at step 754, to FIND FUNCTION ROUTINE 600.

If GET CONVERSATION verb was not recognized at decision step 704, ROUTINE 700 proceeds along NO path 762 to decision step 705. If a PREPARE TO RECEIVE (PTR) verb is recognized at step 705, ROUTINE 700 proceeds along YES path 763 to step 727 within PTR VERB ROUTINE 726. At step 727, the send and function complete flags are each set. Additionally, at step 728, the state variable is set to receive. Upon exiting the PTR VERB ROUTINE, VERB PROCESSING ROUTINE 700 returns to FIND FUNCTION ROUTINE 600.

If a PTR verb was not recognized at decision step 705, ROUTINE 700 proceeds along NO path 764 to decision step 706. If a SEND ERROR verb is recognized at step 706, ROUTINE 700 proceeds along YES path 765 to step 730 within SEND ERROR VERB ROUTINE 729. At step 730, the state variable is set to send. Additionally, at step 731, the send error flag is set. Upon exiting the SEND ERROR VERB ROUTINE, VERB PROCESSING ROUTINE 700 returns, at step 754, to FIND FUNCTION ROUTINE 600.

If a SEND ERROR verb was not recognized at decision step 706, ROUTINE 700 proceeds along NO path 766 to decision step 707. If a RECEIVE verb is recognized at step 707, ROUTINE 700 proceeds along YES path 767 to step 733 within RECEIVE VERB ROUTINE 732. At step 733, ROUTINE 732 queries whether the present function is set to receive (RCV) or get conversation (GETC). If the present function is either of these states, RECEIVE VERB ROUTINE 732 proceeds along YES path 773 to step 739. At step 739, the function found flag and the verb processed flag are set. Subsequently, at step 740, the function variable is set to receive. The state variable is set by steps 741, 742 and 743 depending upon the status (set or not set) of the confirm flag. Specifically, if the confirm flag is set as indicated by decision step 741, ROUTINE 732 proceeds along YES path 779 and sets the state variable, at step 742, to confirmed. Otherwise, ROUTINE 732 proceeds along NO path 778 and sets the state variable, at step 743, to receive. Upon exiting the RECEIVE VERB ROUTINE, VERB PROCESSING ROUTINE 700 returns to FIND FUNCTION ROUTINE 600. Alternatively, if, at decision step 733, the function variable is neither receive (RCV) nor get conversation (GETC), RECEIVE VERB ROUTINE 732 proceeds along NO path 774 to step 734. At step 734, ROUTINE 732 queries whether the verb is a RECEIVE IMMEDIATE (RCVI) verb. If the verb is a RECEIVE IMMEDIATE verb, ROUTINE 732 proceeds along YES path 776 and sets at step 735, the verb processed flag. Otherwise, ROUTINE 732 proceeds along NO path 775 because the verb must be a RECEIVE AND WAIT verb and step 735 is therefore bypassed. At step 736, the function variable is set to send and, at step 737, the state variable is set to receive. Additionally, at step 738, the function complete flag, the function found flag, and the send flag are set. Upon exiting the RECEIVE VERB ROUTINE, VERB PROCESSING ROUTINE 700 returns to FIND FUNCTION ROUTINE 600.

If RECEIVE verb was not recognized at decision step 707, ROUTINE 700 proceeds along NO path 766 to decision step 708. If ROUTINE 700 recognizes, at step 708, a DEALLOCATE verb, ROUTINE 700 proceeds along YES path 760 to step 745 within DEALLOCATE VERB ROUTINE 744. At step 745, the function found flag, the function complete flag, the deallocate flag, and the verb processed flag are each set. At step 746, the function variable is set to send. ROUTINE 744 then proceeds to step 747 wherein the routine queries whether the deallocate type, indicated by a parameter associated with the DEALLOCATE verb, is set to confirm. If the deallocate type is a confirm type, then ROUTINE 744 proceeds along YES path 781 to step 748 wherein the confirmed flag is set. However, if the deallocate type is not a confirm type, then ROUTINE 744 proceeds along NO path 780 and bypasses step 748. At step 749, ROUTINE 744 sets the state variable to reset. Upon exiting the DEALLOCATE VERB ROUTE, VERB PROCESSING ROUTINE 700 returns, via step 754, to FIND FUNCTION ROUTINE 600.

If a DEALLOCATE verb was not found at decision step 708, ROUTINE 700 proceeds along NO path 770 to decision step 709. If ROUTINE 700 recognizes, at step 709, a CONFIRMED verb, ROUTINE 700 proceeds along YES path 771 to step 751 within CONFIRMED VERB ROUTINE 750. At step 751, ROUTINE 750 queries whether the function found flag has been previously set and whether the function variable is presently set to receive. If the query is answered in affirmatively, the routine proceeds along YES path 783 to step 752 wherein the verb processed, the function complete and the confirmed flag are set. Otherwise, if the query at step 751 is answered negatively, ROUTINE 750 proceeds along NO path 782, bypassing step 752 and, at step 753, the error found flag is set. Upon exiting the CONFIRMED VERB ROUTINE, VERB PROCESSING ROUTINE 700 returns, at step 754, to FIND FUNCTION ROUTINE 600.

If CONFIRMED verb was not found at decision step 709, then ROUTINE 700 proceeds along NO path 772 to step 754. Through step 754, VERB PROCESSING ROUTINE 700 returns to FIND FUNCTION ROUTINE 600.

b. RESOLVE ERROR ROUTINE

FIG. 8 depicts a block diagram of RESOLVE ERROR ROUTINE 800. This routine periodically is executed by various other routines to indicate to the user various errors that have been found during execution of the TP COMPARE ROUTINE. As discussed above, as the various routines are executed, various error found flags are set. For each set error found flag, a unique error identification code is stored in memory for subsequent retrieval. Each error identification code indicates the type of error that has occurred. The RESOLVE ERROR ROUTINE recalls these error identification codes and uses them to correct each error. When correction is necessary, ROUTINE 800 suggests to the user, via the display, a number of corrective actions. For example, the user can enter a correction by selecting the correction from a menu or by making a direct entry into an "other" field within the menu. After all of the present error found flags have been processed, ROUTINE 800 returns to the routine from which it was called, e.g., FIND FUNCTION ROUTINE 600 or FIND RESPONSE ROUTINE 1100.

Specifically, RESOLVE ERROR ROUTINE 800 is entered at step 801. At step 802, an error found flag is retrieved from memory along with its associated error identification number. Thereafter, at step 804, the error identification number is used to identify the error that corresponds to the number and any appropriate corrective action that can be accomplished to resolve the error. Typically, the corrective action information is contained in a look-up table that is addressable using the error identification number. At step 806, ROUTINE 800 queries whether a corrective suggestion is available for the particular error, i.e., did the look-up table contain information for the given error identification number. If a suggestion can not be made, ROUTINE 800 proceeds along NO path 807 to step 820 wherein an error message is displayed to the user which indicates the type of error and that a suggestion for correction is not available. ROUTINE 800 then returns, at step 822, to the routine from which it was called.

Alternatively, if a suggestion for correction is available, ROUTINE 800 proceeds along YES path 809 and the suggestion is displayed, at step 808, to the user via the display. Typically, if multiple suggestions are available, the suggestions are displayed in a menu. Alternatively, if the user desires to make a correction that is not contained in the menu, the user can type a correction into an "other" field.

At step 810, ROUTINE 800 queries whether the user has entered a correction. If a correction has not been entered, ROUTINE 800 proceeds along NO path 811 to step 820 wherein an appropriate error message indicating the lack of a correction is displayed. Thereafter, ROUTINE 800 returns, at step 822, to the routine from which the RESOLVE ERROR ROUTINE was called.

If an appropriate correction was made during step 808, ROUTINE 800 proceeds along YES path 813 to step 814 wherein the error found flag is reset and the error identification number is deleted from memory. At step 816, ROUTINE 800 queries whether all the error flags have been processed. If not, ROUTINE 800 proceeds along NO path 818 to step 802 and proceeds to resolve another error. Alternatively, if all the error flags have been processed, ROUTINE 800 proceeds along YES path 819 and returns, at step 822, to the routine from which it was called. The routine from which it was called then processes the correction, e.g., an additional verb or a corrected verb, to ensure that the corrective action actually corrected the error.

A series of illustrative examples will enhance the readers understanding of this routine. For example, if the FIND FUNCTION ROUTINE determines that a function exists, i.e., send, but the FIND RESPONSE ROUTINE does not find a corresponding responsive function, the FIND RESPONSE ROUTINE will set an error flag and mark it with an error identification that indicates a lack of function correspondence to a send function. Consequently, the RESOLVE ERROR ROUTINE, executed from the FIND RESPONSE ROUTINE, will prompt the user with a correction to be made to the partner transaction program such that a corresponding function will appear therein. For example, a RECEIVE AND WAIT verb can be inserted into the partner transaction program. As such, the error would be corrected.

As a second example, the FIND FUNCTION and FIND RESPONSE ROUTINES may determine that both routines begin with the same verb, e.g., ALLOCATE. As such, both the transaction program or its partner are simultaneously attempting to control the conversation. Consequently, the TP COMPARE ROUTINE can not determine the controlling program and, as such, can not accurately determine the appropriate functions and responses for each program. For such an error, no corrective action is adequate. Therefore, the user is notified of the control conflict and would be expected to appropriately correct one program or the other depending upon the application of the programs, i.e., make one of the programs the initially controlling program.

2. SWITCH CONTROL ROUTINE 900

FIG. 9 depicts a flow chart of SWITCH CONTROL ROUTINE 900. SWITCH CONTROL ROUTINE 900 facilitates switching control of a conversation from one transaction program to another. As discussed above, each transaction program has a number of flags and variables associated with it. As such, as one transaction program is being processed and its flags and variables are being used and modified, the flags and variables of the partner transaction program are temporarily stored in memory. Consequently, when control of the conversation changes and the partner transaction program becomes the transaction program for purposes of processing, the flags and variables of the partner transaction program must be recalled from memory. Additionally, the flags and variables for the transaction program must be stored in memory for subsequent use when conversation control returns to that program.

Specifically, SWITCH CONTROL ROUTINE 900 is a callable routine that is entered at step 902. Subsequently, a step 904 the variables and flags for the transaction program are stored in memory. At step 906, the variables and flags are recalled for the partner transaction program. Thereafter, ROUTINE 900 returns, at step 908, to the routine from which it was called.

3. DETERMINE CONTROL ROUTINE 1000

In general, DETERMINE CONTROL ROUTINE 1000 determines whether the transaction program or the partner transaction program is initially controlling the conversation. By APPC definition, the transaction program is always the program which controls the conversation. However, to facilitate comparing the two programs, the transaction program that is initially in control of the conversation forms a reference point to which the other program is compared. As such, the DETERMINE CONTROL ROUTINE 1000 determines which of the two APPC programs recalled from memory by the APPC assist program initially has the function found (FF) flag set and the function variable (FUNC) set to allocate. Under normal circumstances, the program which first uses the ALLOCATE verb, i.e., setting the function variable to allocate during execution of FIND FUNCTION ROUTINE 600, is the program that initially controls the conversation. If both programs indicate this condition or neither does, then ROUTINE 1000 deems an error to exist and an error found flag is set. If the controlling program is determined to be the partner program, SWITCH CONTROL ROUTINE 900 is executed to switch control, i.e., make the partner program the transaction program and vice versa. However, if the controlling program is the present transaction program, the DETERMINE CONTROL ROUTINE executes the FIND FUNCTION ROUTINE and then returns to TP COMPARE ROUTINE 500.

Figure 10:
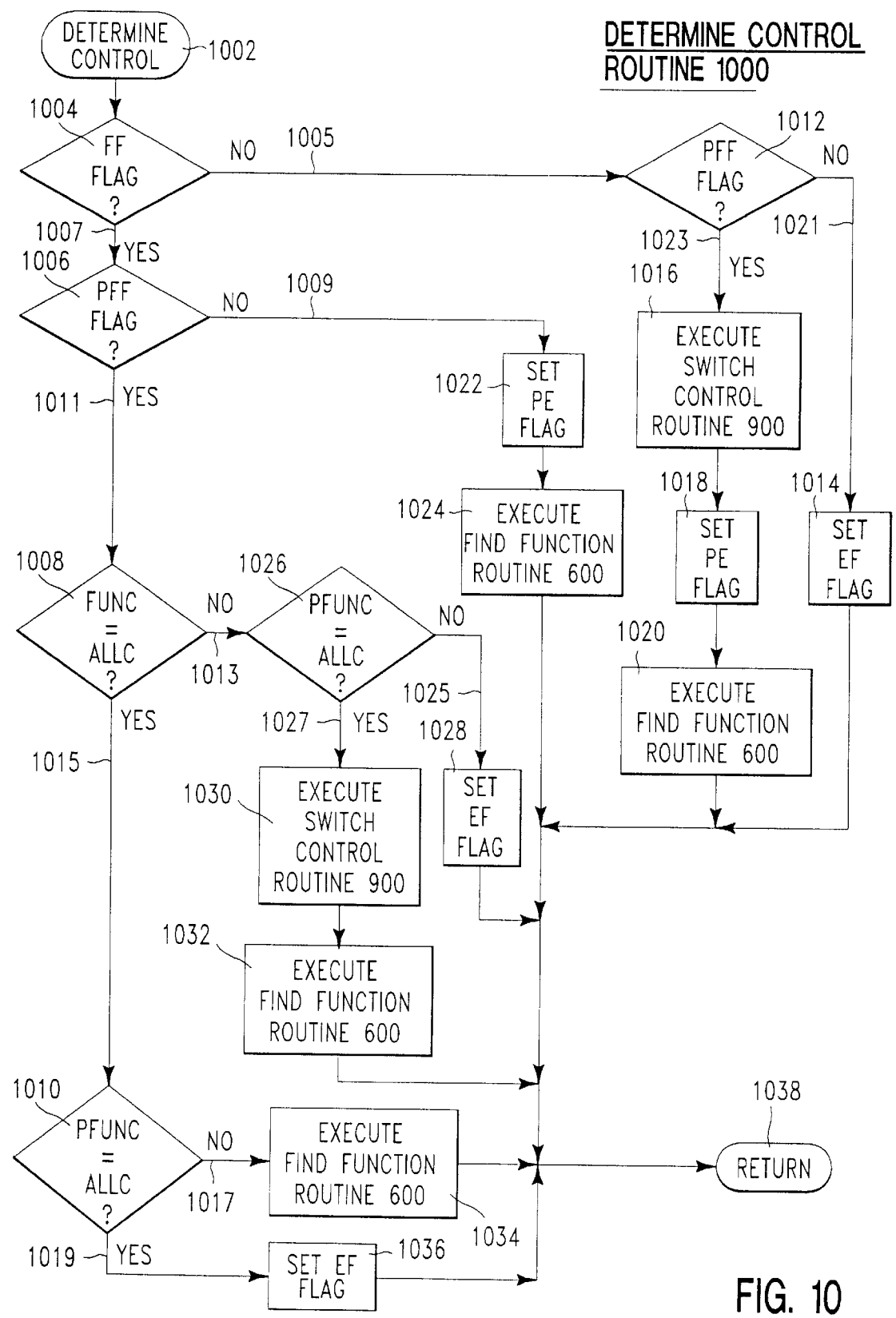
FIG. 10 depicts a flow chart of DETERMINE CONTROL ROUTINE 1000 as executed upon computer system 300 shown in FIG. 3.

Specifically, FIG. 10 depicts a flow chart of DETERMINE CONTROL ROUTINE 1000. DETERMINE CONTROL ROUTINE 1000 is a callable routine that is entered at step 1002. Subsequently, ROUTINE 1000 queries, at step 1004, whether the function found (FF) flag has previously been set indicating that a function appears in the present transaction program. If the function found flag has not been set, the routine proceeds along NO path 1005 to step 1012. At step 1012, the routine queries whether the partner function found (PFF) flag has been set indicating that a function appears in the partner transaction program. If this query is answered in the negative, then the routine deems that neither the transaction program nor its partner has been found to contain a function. This is an erroneous outcome and, as such, ROUTINE 1000 proceeds along NO path 1021 and, at step 1014, sets the error flag. Lastly, ROUTINE 1000 returns, at step 1038, to TP COMPARE ROUTINE 500.

Alternatively, if the query at step 1012 finds the partner function found (PFF) flag is set, ROUTINE 1000 proceeds along YES path 1023 to step 1016. At step 1016, SWITCH CONTROL ROUTINE 900 is executed. This routine, as discussed above, stores and recalls the appropriate flags and variables to facilitate switching control of the conversation from the transaction program to the partner transaction program, thus making the previous transaction program the partner program. At step 1018, the partner empty flag is set indicating that a function was not found in the current partner program. This indicates that the partner transaction program does not exist, i.e., there were no functions in that program as indicated by the function found flag not being found to be set at step 1004. At step 1020, FIND FUNCTION ROUTINE 600 is executed and operates upon the present transaction program. Lastly, ROUTINE 1000 returns, at step 1038, to TP COMPARE ROUTINE 500.

However, if at step 1004, the function found (FF) flag is found to be set, ROUTINE 1000 proceeds along YES path 1007 to step 1006. At step 1006, ROUTINE 1000 queries whether the partner function found (PFF) flag is set. If the partner function flag is not set, i.e., the partner program is non-existent, ROUTINE 1000 proceeds along NO path 1009 and sets, at step 1022, the partner empty (PE) flag. Then, ROUTINE 1000 proceeds to execute, at step 1024, FIND FUNCTION ROUTINE 600 to analyze the present transaction program. Lastly, ROUTINE 1000 returns, at step 1038, to TP COMPARE ROUTINE 500.

Alternatively, if, at step 1006, the partner function found flag is found to be set, the routine proceeds along YES path 1011 to step 1008. With both the programs containing functions, i.e., both queries of steps 1004 and 1006 answered affirmatively, ROUTINE 1000 must now determine which program begins with an ALLOCATE function and thus has initial control of the conversation. At step 1008, ROUTINE 1000 queries whether the function variable is presently set to allocate. If the function variable is not allocate, the routine proceeds to step 1026 wherein it queries whether the partner function variable is set to allocate. If neither function variable is set to allocate, then ROUTINE 1000 proceeds along NO path 1025 and sets the error found flag at step 1028 indicating that both programs contain functions but neither program begins with an ALLOCATE function. If, however, the partner function variable is set to allocate, then ROUTINE 1000 deems the partner program in control of the conversation. Therefore, ROUTINE 1000 proceeds along YES path 1027 and executes SWITCH CONTROL ROUTINE 900, at step 1030, to facilitate the partner program becoming the transaction program. Subsequently, FIND FUNCTION ROUTINE 600 is executed at step 1032 to analyze the next function in the current transaction program. Lastly, ROUTINE 1000 returns, at step 1038, to TP COMPARE ROUTINE 500.

If, however, at step 1008, the function variable is found to be set to allocate, ROUTINE 1000 proceeds along YES path 1015 to step 1010. At step 1010, ROUTINE 1000 queries whether the partner function variable is set to allocate. If the partner function variable is set to allocate, the routine cannot determine which program is presently in control of the conversation, i.e., both function variables are set to allocate and both have set function found flags. Consequently, ROUTINE 1000 proceeds along YES path 1019 and sets, at step 1036, the error found flag to indicate the conflict. Alternatively, if the partner function variable is not set to allocate, the present transaction program is deemed to be in control, i.e., the present transaction program is the program which begins with an ALLOCATE function. As such, ROUTINE 1000 proceeds along NO path 1017 and executes, at step 1034, FIND FUNCTION ROUTINE 600 which operates upon the transaction program. Lastly, ROUTINE 1000 returns, at step 1038, to TP COMPARE ROUTINE 500.

Once the DETERMINE CONTROL ROUTINE has been executed within TP COMPARE ROUTINE 500 (FIG. 5), the controlling program has been twice analyzed by the FIND FUNCTION ROUTINE. The first analysis (steps 506 and 516) found the ALLOCATE function and the second analysis (steps 1024, 1020, 1033 or 1034) found whatever function follows the ALLOCATE function, e.g., the so-called "next function". Next, the FIND RESPONSE ROUTINE is executed to find whatever responsive function appears in the partner transaction program that responds to the first two functions of the transaction program.

4. FIND RESPONSE ROUTINE 1100

As alluded to above, the FIND RESPONSE ROUTINE searches a partner transaction program for the first function in that program and analyzes the verbs contained in that first function. Thereafter, upon each subsequent execution of the FIND RESPONSE ROUTINE, the ROUTINE searches for the next function in the partner transaction program, i.e., the APPC program that is currently not controlling the conversation and analyzes the verbs contained therein. The goal of this routine is to determine if the verbs in the function are appropriately ordered to accomplish the function, that the verbs occur during the proper operational state, and that the necessary verbs are within an appropriate function.

Specifically, FIG. 11 depicts a flow chart of FIND RESPONSE ROUTINE 1100. FIND RESPONSE ROUTINE 1100 is a callable routine that is entered at step 1101. Subsequently, at step 1103, ROUTINE 1100 queries whether the partner empty flag is set. If this flag is set, then the partner transaction program which the FIND RESPONSE ROUTINE is to analyze does not contain any functions. Consequently, ROUTINE 1100 proceeds along YES path 1107 to step 1105 and executes RESOLVE ERROR ROUTINE 800 to enable the user to generate a responsive function using suggestions provided by the RESOLVE ERROR ROUTINE. In this manner, a partner transaction program can be generated that will communicate with a preexisting transaction program.

Alternatively, if the partner empty flag is not set, ROUTINE 1100 proceeds along NO path 1109 to step 1102. At step 1102, an initialization routine is executed to initialize variables, flag settings and various buffers used by ROUTINE 1100. At step 1104, ROUTINE 1100 queries whether a verb has been found, i.e., verb≠null. If a verb is found, ROUTINE 1100 proceeds along YES path 1113 to step 1106; otherwise, ROUTINE 1100 proceeds along NO path 1111 to step 1112.

Figures 12, 12A:
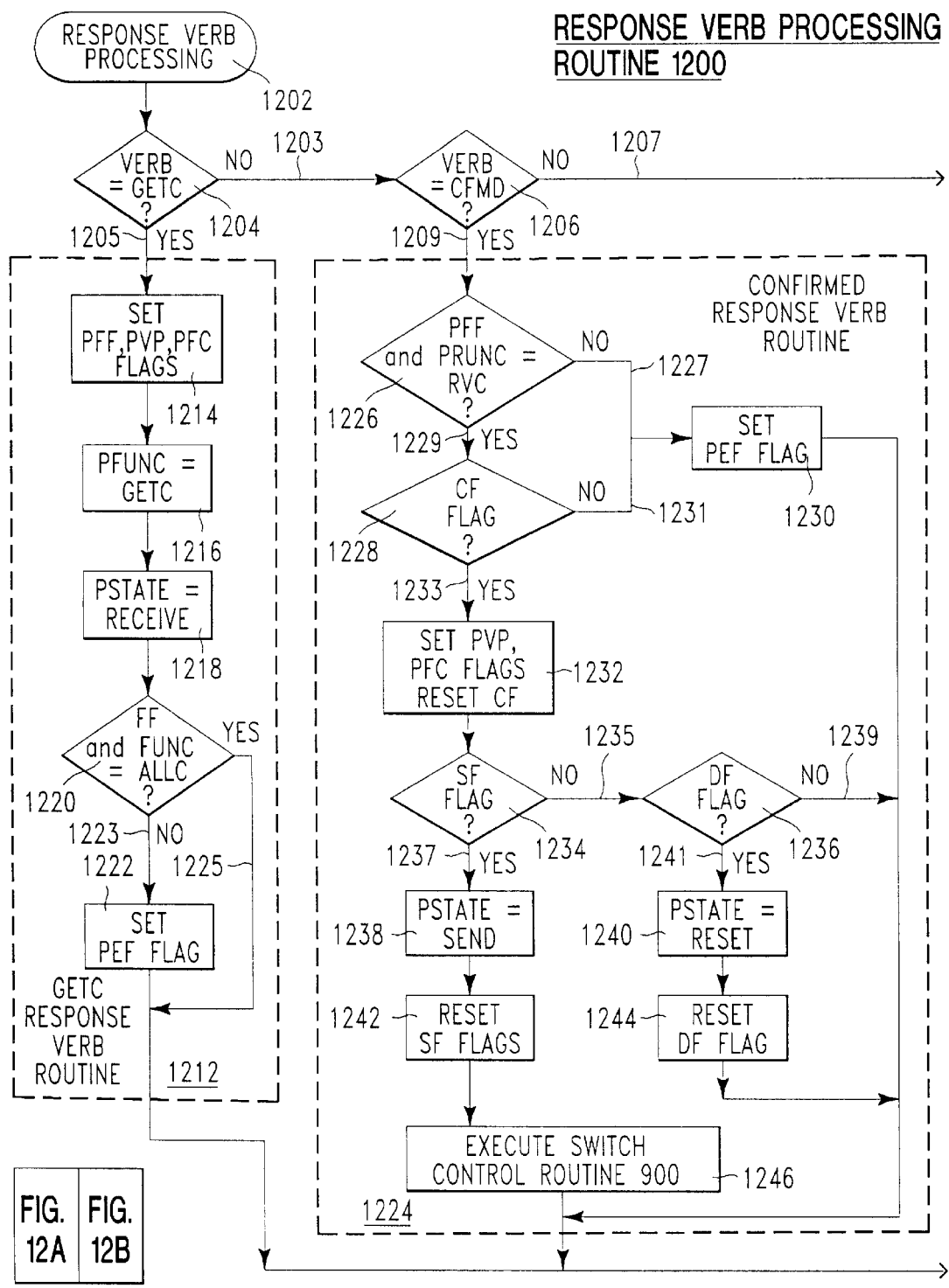

At step 1106, ROUTINE 1100 queries whether the verb has a "legal state". At step 1106, ROUTINE 1100 accesses a database of verbs and their associated allowable states. TABLE 1 contains an illustrative list of verbs and their legal states. The present verb is compared to states appropriate for that verb. If the present state, i.e., the present STATE variable, matches the appropriate state for that verb, the verb is deemed to have a legal state. Otherwise, the verb is deemed to be in an illegal state. If an illegal state is indicated, ROUTINE 1100 proceeds along NO path 1115 and sets the error found flag at step 1110. If a legal state is evident for the present verb, ROUTINE 1100 proceeds along YES path 1117 and executes, at step 1108, VERB PROCESSING ROUTINE 1200 (which is depicted in FIG. 12 and discussed in conjunction therewith below).

VERB PROCESSING ROUTINE 1200 determines the specific type of verb that is presently being processed and sets various flags and variable values based upon the verb determination. Specifically, the present verb is matched to a verb contained in a list of a plurality of verbs. Once a verb match is found, that particular verb is processed in a specific manner.

If, upon attempting to match the present verb with each allowable verb, a match is not found, FIND RESPONSE ROUTINE 1100 proceeds to step 1122. At this step, ROUTINE 1100 queries whether an error found flag was set during verb processing. If a verb match was not found, an error found flag would not be set, i.e., a verb was not processed to cause an error. As such, the answer to the query of step 1122 is negative. ROUTINE 1100 then proceeds along NO path 1145 to step 1126. At step 1126, ROUTINE 1100 queries whether the partner function complete (PFC) flag is set. Since a verb was not processed, the partner function complete flag can not be set. As such, ROUTINE 1100 proceeds along path 1147 to step 1128 wherein the next verb in the program is found.

Returning to step 1122, if a verb was processed that resulted in the error found flag being set, the query at step 1122 would be affirmatively answered. In response, ROUTINE 1100 proceeds along YES path 1143 and executes, at step 1124, RESOLVE ERROR ROUTINE 800. As discussed above, RESOLVE ERROR ROUTINE 800 identifies the error and prompts the user with a menu of suggested corrective actions. Once corrective action is taken, ROUTINE 800 returns to ROUTINE 1100 at step 1126.

At step 1126, ROUTINE 1100 queries whether the partner function complete (PFC) flag has been set. This flag is set during verb processing when the last verb in a function is processed. If the partner function complete flag is not set, ROUTINE 1100 proceeds along NO path 1147 and retrieves, at step 1128, the next verb in the function and processes that verb in the manner described above, i.e., starting at step 1104. If a correction was entered, the next verb is the corrected verb. Alternatively, if the function complete flag is set, ROUTINE 1100 proceeds along YES path 1149 and returns, at step 1130, to TP COMPARE ROUTINE 500.

Returning to step 1104, if a verb does not exist, the only legal states are reset and receive. At step 1112, the ROUTINE queries whether the state variable is presently set to "reset". If the present state is reset, ROUTINE 1100 proceeds along YES path 1131 and sets, at step 618, the partner function complete flag (PFC). Alternatively, if the state variable is not set to the reset state, ROUTINE 1100 proceeds along NO path 1133 and queries, at step 1114, whether the state variable is presently the receive state. If the state is receive, then, ROUTINE 1100 proceeds along YES path 1135 and, at step 1119, queries whether the deallocate flag (DF) is set. If the deallocate flag is not set, then, ROUTINE 1100 proceeds along NO path 1141 and sets, at step 1121, the error found flag. Alternatively, if the deallocate flag is set, then ROUTINE 1100 proceeds along YES path 1139 and sets, at step 1120, the partner function complete (PFC) and the partner verb processed (PVP) flags.

Returning to step 1114, if the receive state is not set, then, ROUTINE 1100 proceeds along NO path 1137 and sets, at step 1116, the error found flag. Thereafter, ROUTINE 1100 proceeds to step 1122 and performs steps 1122, 1124, 1126, 1128 and 1130 as described previously.

a. RESPONSE VERB PROCESSING ROUTINE 1200

FIG. 12 depicts a proper arrangement of FIGS. 12A and 12B. Collectively, FIGS. 12A and 12B depict a flow chart of RESPONSE VERB PROCESSING ROUTINE 1200. This routine determines whether the present verb is appropriate for the present function and state. In response to the verb type, function and state, a number of variables and flags are set. Since there are a large number of verbs available for use in a partner transaction program, depicting a flow chart for sorting through all possible verbs would require an excessive number of drawings. As such, ROUTINE 1200, as shown, sorts an illustrative number of verbs. The verbs chosen for this illustrative routine are, in general, the most commonly used responsive verbs. Specifically, the verbs processed by ROUTINE 1200 are CONFIRMED (CFMD), GET CONVERSATION (GETC) and RECEIVE (RCV). The RECEIVE verb can be either the RECEIVE AND WAIT (RCVW) verb or the RECEIVE IMMEDIATE (RCVI) verb. Those skilled in the art will readily understand the functionality of each of these verbs. Therefore, a review of their operation and function is unnecessary.

In general, ROUTINE 1200 is a callable routine which is entered at step 1202. Thereafter, ROUTINE 1200 sequentially queries whether the present verb matches one of a plurality of verbs. Each individual query is represented by steps 1204, 1206, 1208 and 1210. When a particular verb match occurs, a particular verb processing routine is executed. For example, if the present verb is a GET CONVERSATION verb, query at step 1204 would be affirmatively answered and ROUTINE 1200 proceeds along YES path 1205 to execute GET CONVERSATION RESPONSE VERB ROUTINE 1212.

If a GET CONVERSATION (GETC) verb is recognized at step 1204, ROUTINE 1200 proceeds along YES path 1205 to step 1214 within GET CONVERSATION RESPONSE VERB ROUTINE 1212. At step 1214, the partner function found (PFF) flag, partner function complete (PFC) flag and partner verb processed (PVP) flag are each set. Additionally, at step 1216, the partner function (PFUNC) variable is set to get conversation (GETC) and, at step 1218, the partner state (PSTATE) variable is set to receive. At step 1220, ROUTINE 1212 queries whether the function found (FF) flag is set and whether the present function (FUNC) for the transaction program is an allocate function. If either variable is incorrect, then the function of the transaction program does not correspond to the GET CONVERSATION verb present in the partner transaction program. Consequently, ROUTINE 1212 proceeds along NO path 1223 to step 1222 wherein the partner error found (PEF) flag is set. However, if the function found (FF) flag and function variable are correct, ROUTINE 1212 proceeds along YES path 1225 which bypasses step 1222 and proceeds directly to step 1276. Upon exiting the GET CONVERSATION RESPONSE VERB ROUTINE, RESPONSE VERB PROCESSING ROUTINE 1200 returns, at step 1276, to FIND RESPONSE ROUTINE 1100.

If a GETC verb was not recognized at decision step 1204, ROUTINE 1200 proceeds along NO path 1203 to decision step 1206. If ROUTINE 1200 recognizes, at step 1206, a CONFIRMED verb, ROUTINE 1200 proceeds along YES path 1209 to step 1226 within CONFIRMED RESPONSE VERB ROUTINE 1224. At step 1226, ROUTINE 1224 queries whether the partner function found (PFF) flag is set and whether the partner function (PFUNC) variable is set to receive (RCV). If the query at step 1226 is negatively answered, then ROUTINE 1224 proceeds along NO path 1227 and sets, at step 1230, the partner error found (PEF) flag. Then ROUTINE 1224 returns, via step 1276, to FIND RESPONSE ROUTINE 1100. However, if the query at step 1226 is affirmatively answered, ROUTINE 1224 proceeds along YES path 1229 to step 1228 wherein ROUTINE 1224 queries whether the confirm flag is set. If this flag is not set, then ROUTINE 1224 proceeds along NO path 1231 and sets, at step 1230, the partner error found flag. However, if the confirm flag is set, ROUTINE 1224 proceeds along YES path 1233 to step 1232. At step 1232, the partner verb processed (PVP) and partner function complete (PFC) flags are set and the confirm (CF) flag is reset. Subsequently, ROUTINE 1224 proceeds to step 1234.

At step 1234, ROUTINE 1224 queries whether the send flag is set. If the flag is set, ROUTINE 1224 proceeds along YES path 1237 to step 1238 wherein the partner state variable (PSTATE) is set to send and thereafter, at step 1242, the send flag is reset. Subsequently, ROUTINE 1224 executes SWITCH CONTROL ROUTINE 900. Since a CONFIRMED verb is being processed, the present partner program must send a confirmation to the present transaction program. As such, the present partner program must be switched to a transaction program, i.e., attain control of the conversation, to send information. Consequently, upon processing a CONFIRMED verb, the SWITCH CONTROL ROUTINE must be executed. Upon exiting the CONFIRMED RESPONSE VERB ROUTINE, RESPONSE VERB PROCESSING ROUTINE 1224 returns, via step 1276, to FIND RESPONSE ROUTINE 1100.

If the send flag is not set, ROUTINE 1224 proceeds along NO path 1235 and queries, at step 1236, whether the deallocate flag is set. If the deallocate flag is set, ROUTINE 1224 proceeds along YES path 1241 to step 1240 whereby the state variable is set to reset and thereafter, at step 1244, the deallocate flag is reset. If neither the send flag nor the deallocate flag are set, then ROUTINE 1224 proceeds along NO path 1239 and bypasses steps 1238, 1240, 1242, 1244 and 1246. From both NO path 1239 and step 1244, ROUTINE 1224 is exited and RESPONSE VERB PROCESSING ROUTINE 1224 returns, via step 1276, to FIND RESPONSE ROUTINE 1100.

If a CONFIRMED verb was not recognized at decision step 1206, ROUTINE 1200 proceeds along NO path 1207 to decision step 1208. If a RECEIVE verb is recognized at step 1208, ROUTINE 1200 proceeds along YES path 1213 to step 1250 within RECEIVE RESPONSE VERB ROUTINE 1248. At step 1250, ROUTINE 1248 queries whether the present partner function (PFUNC) is set to receive, whether the data (DT) flag is not set and whether the partner function found (PFF) flag is set. If these criteria are not fulfilled, ROUTINE 1248 proceeds along NO path 1251 to step 1252. At step 1252, the routine queries whether the send (SF) flag is set and the confirm (CF) flag is not set. If these criteria are met, then the routine proceeds along YES path 1257 to step 1258. At step 1258, the partner state variable (PSTATE) is set to send. Alternatively, depending upon the status of the confirm and send flags, ROUTINE 1248 proceeds along NO path 1255 to set, at step 1254, the partner state variable to receive. At step 1260 and step 1262, respectively, the partner function variable is set to receive and the partner function found (PFF) flag is set. At step 1264, ROUTINE 1248 queries whether the function variable (FUNC) is set to send. If the function variable is presently set to send, then ROUTINE 1248 proceeds along YES path 1267 and sets, at step 1268, the partner verb processed (PVP) flag. If the function variable is not set to send, then ROUTINE 1248 proceeds along NO path 1265 and sets, at step 1266, the partner error flag. Upon exiting the RECEIVE RESPONSE VERB ROUTINE, RESPONSE VERB PROCESSING ROUTINE 1200 returns to FIND RESPONSE ROUTINE 1100.

Alternatively, if, at step 1250, the partner function variable is not set to receive, the partner function found flag is not set or the data flag is set, ROUTINE 1248 proceeds along YES path 1253 to step 1256. At step 1256, ROUTINE 1248 sets the partner error flag. Upon exiting the RECEIVE RESPONSE VERB ROUTINE, RESPONSE VERB PROCESSING ROUTINE 1200 returns to FIND RESPONSE ROUTINE 1100.

If a RECEIVE verb was not found at decision step 1208, ROUTINE 1200 proceeds along NO path 1211 to decision step 1210. All other verbs cause ROUTINE 1200 to proceed along YES path 1217 to execute OTHER RESPONSE VERB ROUTINE 1270. At step 1272, the send flag is reset and the partner function complete flag is set. It is assumed that any verbs not already processed must be processed as verbs within a transaction program, i.e., all other verbs are associated with the program controlling the conversation. As such, at step 1274, SWITCH CONTROL ROUTINE 900 is executed as discussed above with reference to FIG. 9. Upon exiting the OTHER RESPONSE VERB ROUTINE, RESPONSE VERB PROCESSING ROUTINE 1200 returns, at step 1276, to FIND RESPONSE ROUTINE 1100.

IF no verbs at all are found within the partner transaction program, then RESPONSE VERB PROCESSING ROUTINE 1200 proceeds along NO path 1215 and returns, at step 1276, to FIND RESPONSE ROUTINE 1100.

B. TP BUILD ROUTINE 1300

Now that TP COMPARE ROUTINE 500 has completely evaluated the transaction program and its partner, the programs must be completed and compiled. At this point the programs are known as "skeletal" versions of APPC programs or merely as "skeletons". Each program, in essence, is a list of appropriately ordered verbs. Completion requires defining parameters used with each verb, then compiling the skeletal programs into executable code. To facilitate compiling the programs into executable code, MAIN ROUTINE 400 (FIG. 4) executes TP BUILD ROUTINE 1300.

Figure 13:
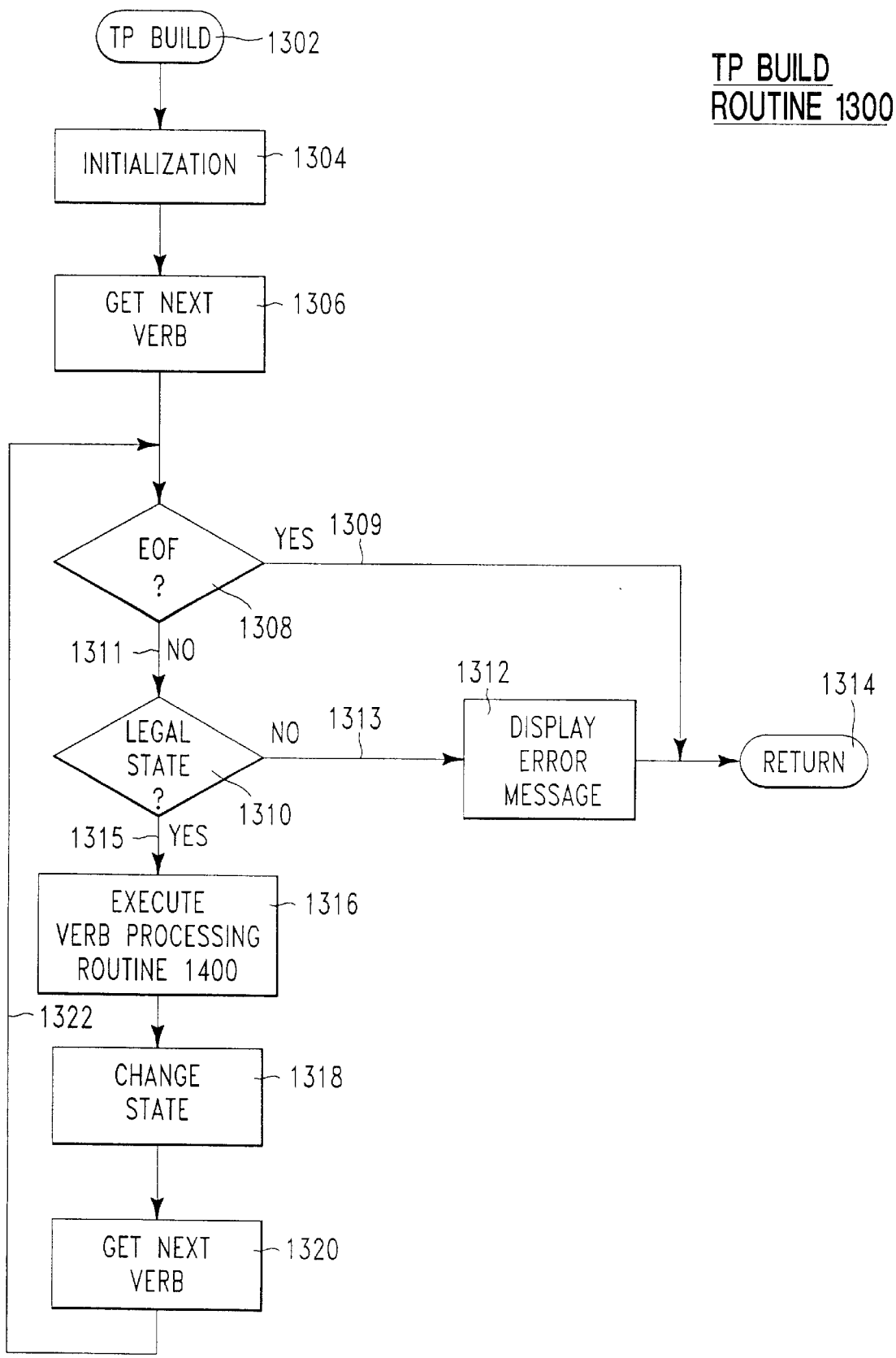
FIG. 13 depicts a flow chart of TP BUILD ROUTINE 1300 as executed upon computer system 300 shown in FIG. 3.

Specifically, FIG. 13 depicts a flow chart of TP BUILD ROUTINE 1300. ROUTINE 1300 is a callable routine that is entered at step 1302 from MAIN ROUTINE 400. Subsequently, at step 1304, various flags and variables are initialized. At step 1306, the next verb is retrieved from an input file. In operation, the input file (transaction program or partner transaction program) is searched for either a verb or an end of file indicator. Once a verb or end of file indicator is found, ROUTINE 1300 proceeds to step 1308. At step 1308, ROUTINE 1300 queries whether the end of file (EOF) indicator was found. If an EOF was found, ROUTINE 1300 proceeds along YES path 1309 and returns, at step 1314, to MAIN PROGRAM 400. If the end of file indicator is not evident, ROUTINE 1300 proceeds along NO path 1311 to step 1310. At step 1310, the routine queries whether the present state variable is legal, i.e., appropriate for the verb found. As discussed above, the verb must correspond to a proper state as illustrated in TABLE 1 above. If the state is illegal, ROUTINE 1300 proceeds along NO path 1313 and an error message is displayed to the user at step 1312 and the routine is exited at step 1314. If the state variable is set to a legal state with reference to the present verb, ROUTINE 1300 proceeds along YES path 1315 to step 1316. The state variable check adds redundancy. Specifically, the TP COMPARE ROUTINE should have removed any state errors. However, if not, those errors will appear here.

Figure 14:
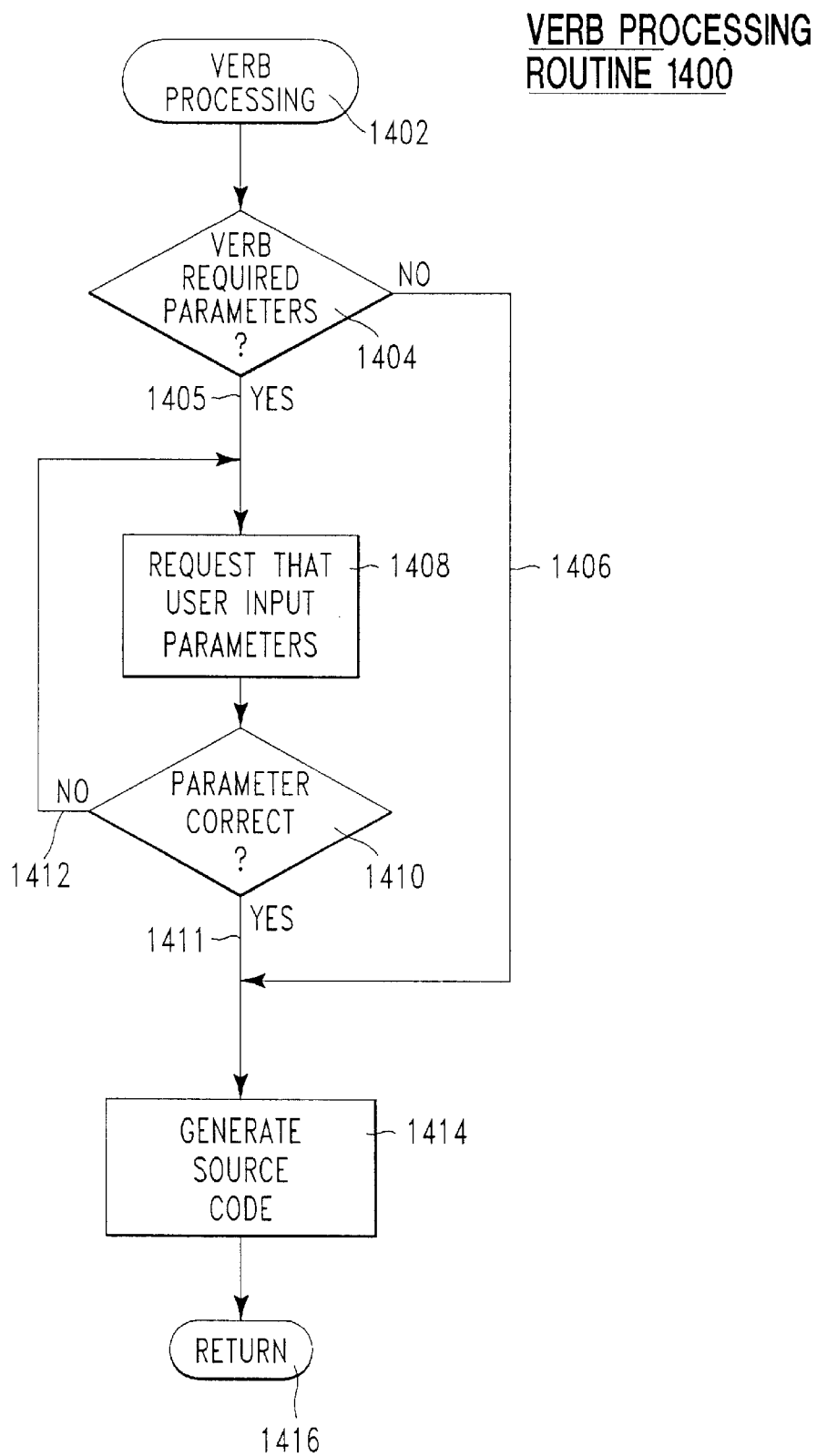
FIG. 14 depicts a flow chart of VERB PROCESSING ROUTINE 1400 as executed upon computer system 300 shown in FIG. 3.

At step 1316, ROUTINE 1300 executes VERB PROCESSING ROUTINE 1400 (which is depicted in FIG. 14 and discussed in conjunction therewith below). The VERB PROCESSING ROUTINE requests that the user enter appropriate parameters for the verb. Once entered, the VERB PROCESSING ROUTINE compiles the verb and its parameters into a portion of source code.

Subsequent to verb compilation, at step 1318, if necessary, the state variable is changed. The state is changed to conform the state variable to the state generated by the prior verb and its parameters. This change facilitates the state variable redundancy check discussed above.

Additionally, at step 1320, the input file is searched for the next sequential verb therein or an end of file indicator. ROUTINE 1300 proceeds along path 1322 to step 1308 to either compile the next verb or exit the routine because an end of file indicator is recognized.

As the TP BUILD ROUTINE processes each verb, the ROUTINE creates a portion of source code for that verb. The source code is produced in accordance with the language, platform and operating system selected by the user at the outset of executing the APPC assist program. The source code for each verb is appended to the source code for the previously compiled verb to generate a source code program for that input file. Typically, both the transaction and partner transaction programs are sequentially processed in this manner such that corresponding source code programs are generated for each program. Subsequently, these source code programs can be installed upon different platforms such that the transaction and partner transaction programs facilitate communications between application programs executing upon those platforms.

1. VERB PROCESSING ROUTINE 1400

FIG. 14 depicts a flow chart of VERB PROCESSING ROUTINE 1400. In general, for each verb in a transaction program, this routine determines whether parameters are necessary to enable the verb to be compiled into source code. If no parameters are necessary, the verb is compiled without action by the user. However, if parameters are necessary to further define the verb and its application, the user is prompted to enter appropriate parameters for each verb. Once the appropriate parameters are generated, the verb is compiled into source code.

Specifically, VERB PROCESSING ROUTINE 1400 is a callable routine that is entered at step 1402 from TP BUILD ROUTINE 1300 (FIG. 13). Subsequently, ROUTINE 1400 proceeds to step 1404 wherein the routine queries whether the verb needs to be defined with parameters. In general, to determine if the verb needs defining, the verb is compared to a database of verbs needing parameters until a match results. If a match is found, the query at step 1404 is affirmatively answered and ROUTINE 1400 proceeds along YES path 1405. If no match is found, the query is answered negatively and ROUTINE 1400 proceeds along NO path 1406 and bypasses steps 1408 and 1410.

If the verb needs parameters, the necessary parameters to be filled are recalled from the database. At step 1408, the user is requested via the display to enter values for the various parameters. Once entered, at step 1410, ROUTINE 1400 checks to ensure that the entered parameter values are correct. If an incorrect value was entered, ROUTINE 1400 returns, along path 1412, to step 1408 and the user is requested to enter the parameter values again. If all the values are correct, ROUTINE 1400 proceeds along YES path 1411 to step 1414. At step 1414, the verb and its parameters are used to generate source code. As each verb in the skeletal transaction or partner transaction program is processed, its source code is appended to that of the previously processed verb. Consequently, once all the verbs in a transaction program or partner transaction program are processed, a complete source code listing for that program is available. ROUTINE 1400 returns, at step 1416, to TP BUILD ROUTINE 1300.

The foregoing embodiment involves either comparing two existing APPC programs or generating an APPC program, e.g., a partner transaction program, from a pre-existing APPC program, e.g., a transaction program. However, through my inventive method, both APPC programs can be developed simultaneously. For example, if the APPC assist program begins operation upon two empty files, the user is prompted for verbs to complete the files and ultimately produce two, conversant APPC programs. Specifically, TP COMPARE ROUTINE 500 (FIG. 5) is capable of determining that the transaction and partner transaction programs are empty. As such, a user is prompted to correct errors, i.e., the lack of verbs, in each program. Consequently, by making each correction, the user builds, verb-by-verb, both a skeletal transaction and partner transaction programs. Once complete, the two programs are compiled by TP BUILD ROUTINE 1300 (FIG. 13).

Although various embodiments which incorporate the teachings of the present invention have been shown and described in detail herein, those skilled in the art can readily devise many other varied embodiments that still incorporate these teachings.

What is claimed is:

1. A method for automatically testing a pair of communications programs for utilization within a computer network environment wherein said communications programs are used to establish a communication link between two computer systems, each of which executes one of said communications programs, said method comprising the steps of:

(a) comparing a first communications program with a second communications program to determine whether the communications programs are capable of establishing said communication link, said comparing step further comprising the steps of:
(1) determining whether said first or second communications program is controlling said communication link;
(2) processing verbs contained in a first function of the controlling communications program;
(3) processing verbs contained in a first function of the non-controlling communications program that is a responsive function to said first function in said controlling communications program;
(4) repetitively comparing processed functions and verbs contained in said controlling communications program with responsive processed functions and verbs in said non-controlling communications program; and
(5) repetitively comparing processed functions and verbs in said non-controlling communications program with the responsive processed functions and verbs in said controlling communications program;

(b) determining errors in said communications programs that would inhibit establishment of said communication link; and (c) resolving said errors in such a manner as to enable the establishment of said communication link between said first and second communications programs.

2. A method for automatically testing a pair of communications programs for utilization within a computer network environment wherein said communications programs are used to establish a communication link between two computer systems, each of which executes one of said communications programs, said method comprising the steps of:

(a) comparing a first communications program with a second communications program to determine whether the communications programs are capable of establishing said communication link, said comparing step further comprising the steps of:
(1) finding a first function in said first communications program;
(2) finding a first function in said second communications program;
(3) determining which first function controls a prospective communication link between said first and said second communications programs;
(4) if neither or both first functions control said prospective communication link, producing an error flag;
(5) otherwise, naming the communications program having the controlling function as a transaction program and the communications program having the non-controlling function as a partner transaction program; and
(6) determining whether said non-controlling first function is responsive to said controlling first function;

(b) determining errors in said communications programs that would inhibit establishment of said communication link; and (c) resolving said errors in such a manner as to enable the establishment of said communication link between said first and second communications programs.

3. The method of claim 2 further comprising the steps of:
determining if a next function in said partner transaction program is a controlling function;
if said next function is a controlling function, re-naming said partner transaction program as a transaction program and said transaction program as a partner transaction program;

otherwise, maintaining the communications program names as presently named;

determining whether a next function in said partner transaction program is responsive to said next function in said transaction program;

repeating said determining, re-naming, and determining steps until all the functions in said communications programs have been compared.

4. The method of claim 3 wherein said error determining step further comprises the step of producing an error flag whenever said function in said partner transaction program is non-responsive to said function in said transaction program.

5. The method of claim 4 wherein said error determining step further comprises the step of producing an error flag whenever said function in either said partner transaction program or said transaction program and a state variable is not appropriate for a current function being processed.

6. The method of claim 5 wherein said functions are implemented by at least one verb.

7. The method of claim 6 wherein said error determining step further comprises the step of producing an error flag whenever said verb does not correspond to an appropriate function.

8. A method for generating a second communications program from an existing communications program such that the two communications programs provide a communication link within a computer network environment, said method comprising the steps of:

(a) inspecting computer code contained in said existing communications program to determine whether said existing communications program contains a first controlling function;

(b) if said existing communications program contains said first controlling function:
  (1) prompting a user to select a responsive function for insertion into said second communications program such that said responsive function is responsive to said first controlling function; and
  (2) inserting appropriate computer code providing said responsive function into said second communications program such that said existing communications program can establish a communication link to said second communications program; and (c) if said existing communications program does not contain said first controlling function, prompting a user to insert said first controlling function into said second communications program.

9. A method for generating a second communications program from an existing communications program such that the two communications programs provide a communication link within a computer network environment, said method comprising the steps of:

(a) inspecting computer code contained in said existing communications program, said inspecting step comprising the steps of:
  (1) finding a first function in said existing communications program;
  (2) determining whether said first function controls the communication link;
  (3) if said first function does not control said communication link, producing an error flag; and
  (4) otherwise, naming the existing communications program a transaction program and said second communications program as a partner transaction program.

(b) determining appropriate computer code to correspond to said computer code contained in said existing communications program; and (c) inserting said appropriate computer code into said second communications program such that said existing communications program can establish a communication link to said second communications program.

10. The method of claim 9 wherein said determining step further comprises the steps of:

resolving said error flag by determining a controlling function and verb to be inserted into said second communications program;

inserting said controlling function and verb into said second communications program; and naming said second communications program as a transaction program and said existing communications program as a partner transaction program.

11. The method of claim 10 further comprising steps of:

determining if a next function in said partner transaction program is a controlling function;

if said next function is a controlling function, re-naming said partner transaction program as a transaction program and said transaction program as a partner transaction program;

otherwise, maintaining the present program names;

determining whether a next function in said partner transaction program exists;

if said next function exists, ensuring that said next function in said partner transaction program is responsive to said next function in said transaction program;

if said next function does not exist or said next function is non-responsive, then inserting a responsive next function into said partner transaction program; and repeating the aforementioned steps until all the functions in said programs have been compared.

12. The method of claim 11 further comprising the step of producing an error flag whenever said function in said partner transaction program is non-responsive to said function in said transaction program or non-existent.

13. The method of claim 12 further comprising the step of producing an error flag whenever said function in either said partner transaction program or said transaction program and a state variable is not appropriate for a present function being processed.

14. The method of claim 13 wherein said functions are implemented by at least one verb.

15. The method of claim 14 further comprising the step of producing an error flag whenever a verb does not correspond to an appropriate function.

16. The method of claim 15 further comprising the steps of:

prompting a user with a menu of alternative program corrections that may be selected to correct an identified error; and inserting a selected program correction into a program having the identified error.

17. The method of claim 16 wherein said existing and second communications programs are skeletal programs.

18. The method of claim 17 further comprising the step of compiling source code for each communications program, where each communications program is compiled into pre-defined computer languages that operate on specific pre-defined computer systems running pre-defined operating systems.

19. The method of claim 18 wherein said compiling step further comprises the step of prompting a user to enter or select parameters for each verb in each of the programs.

20. Apparatus for automatically testing a pair of communications programs for utilization within a communications network environment wherein said communications programs are used to establish a communication link between two computer systems, each of which executes one of said communications programs, said apparatus comprising:

(a) means for comparing a first communications program with a second communications program to determine whether the communications programs are capable of establishing said communication link, said comparing means comprising:
   (1) means for determining whether said first or second communications program is controlling said communication link;
   (2) means for processing verbs contained in a first function of said controlling communications program;
   (3) means for processing verbs contained in a first function of said non-controlling communications program that is a responsive function to said first function in said controlling communications program;
   (4) means for repetitively comparing processed functions and verbs contained in said controlling communications program with responsive processed functions and verbs in said non-controlling communications program; and
   (5) means for repetitively comparing processed functions and verbs in said non-controlling communications program with the responsive processed functions and verbs in said controlling communications program;

(b) means for determining errors in either said first or second communications programs that would inhibit establishment of the communication link; and (c) means for resolving said errors in such a manner as to enable the establishment of said communication link between said first and second communications programs.

21. Apparatus for automatically testing a pair of communications programs for utilization within a communications network environment wherein said communications programs are used to establish a communication link between two computer systems, each of which executes one of said communications programs, said apparatus comprising:

(a) means for comparing a first communications program with a second communications program to determine whether the communications programs are capable of establishing said communication link, said comparing means comprising:
   (1) means for finding a first function in said first communications program;
   (2) means for finding a first function in said second communications program;
   (3) means for determining which first function controls a prospective communication link between said first and said second communications programs;
   (4) means for producing an error flag if neither or both first functions control said prospective communication link;
   (5) means for naming the communications program having the controlling function as a transaction program and the communications program having the non-controlling function as a partner transaction program; and
   (6) means for determining whether said non-controlling first function is responsive to said controlling first function;

(b) means for determining errors in either said first or second communications programs that would inhibit establishment of the communication link; and (c) means for resolving said errors in such a manner as to enable the establishment of said communication link between said first and second communications programs.

22. The apparatus of claim 21 further comprising:

means for determining if a next function in said partner transaction program is a controlling function;

means for re-naming said partner transaction program as a transaction program and said transaction program as a partner transaction program, if said next function is determined to be a controlling function;

means for maintaining the program names as presently named, if said next function is not determined to be a controlling function;

means for determining whether a next function in said partner transaction program is responsive to said next function in said transaction program;

means for repetitively engaging said determining, re-naming, and determining means until all the functions in said communications programs have been compared.

23. The apparatus of claim 22 wherein said error determining means further comprises means for producing an error flag whenever said function in said partner transaction program is non-responsive to said function in said transaction program.

24. The apparatus of claim 23 wherein said error determining means further comprises means for producing an error flag whenever said function in either said partner transaction program or said transaction program and a state variable is not appropriate for a current function being processed.

25. The apparatus of claim 24 wherein said functions are implemented by at least one verb.

26. The apparatus of claim 25 wherein said error determining means further comprises means for producing an error flag whenever said verb does not correspond to an appropriate function.

27. Apparatus for generating a second communications program from an existing communications program such that the two communications programs provide a communication link within a computer network environment, said apparatus comprising:

(a) means for inspecting computer code contained in said existing communications program to determine whether said existing communications program contains a first controlling function;

(b) means responsive to said existing communications program containing said first controlling function for:
   (1) prompting a user to select a responsive function for insertion into said second communications program such that said responsive function is responsive to said first controlling function; and
   (2) inserting appropriate computer code providing said responsive function into said second communications program such that said existing communications program can establish a communication link to said second communications program; and (c) means responsive to said existing communications program not containing said first controlling function for prompting said user to insert said first controlling function into said second communications program.

28. Apparatus for generating a second communications program from an existing communications program such that the two communications programs provide a communication link within a computer network environment, said apparatus comprising:

(a) means for inspecting computer code contained in said existing communications program, said inspecting means further comprises:
  (1) means for finding a first function in said existing communications program;
  (2) means for determining whether first function controls the communication link;
  (3) means for producing an error flag if said first function does not control said conversation; and
  (4) means for naming the existing communications program a transaction program and said second communications program as a partner transaction program if said first function does control said conversation
(b) means for determining appropriate computer code to correspond to said computer code contained in said existing communications program; and
(c) means for inserting said appropriate computer code into said second communications program such that said existing communications program can establish a communication link to said second communications program.

29. The apparatus of claim 28 wherein said determining means further comprises:

means for resolving said error flag by determining a controlling function and verbs to be inserted into said second communications program;

means for inserting said controlling function and verbs into said second communications program; and means for naming said second communications program as a transaction program and said existing communications program as a partner transaction program.

30. The apparatus of claim 29 further comprising:

means for determining if a next function in said partner transaction program is a controlling function, means for re-naming, if said next function is a controlling function, said partner transaction program as a transaction program and said transaction program as a partner transaction program;

means for maintaining, if said next function is not a controlling function, the present program names;

means for determining whether a next function in said partner transaction program exists;

means for ensuring, if said next function exists, that said next function in said partner transaction program is responsive to said next function in said transaction program;

means for inserting, if said next function does not exist or said next function is non-responsive, a responsive next function into said partner transaction program; and means for repetitively engaging each of the aforementioned means until all the functions in said programs have been compared.

31. The apparatus of claim 30 further comprising means for producing an error flag whenever said function in said partner transaction program is non-responsive to said function in said transaction program or non-existent.

32. The apparatus of claim 30 further comprising means for producing an error flag whenever said function in either said partner transaction program or said transaction program and a state variable is not appropriate for a present function being processed.

33. The apparatus of claim 32 wherein said functions are implemented by at least one verb.

34. The apparatus of claim 33 further comprising means for producing an error flag whenever a verb does not correspond to an appropriate function.

35. The apparatus of claim 34 further comprising:

means for prompting a user with a menu of alternative program corrections that may be selected to correct an identified error; and means for inserting a selected program correction into a program having the identified error.

36. The apparatus of claim 35 wherein said existing and second communications programs are skeletal programs.

37. The apparatus of claim 36 further comprising means for compiling source code for each communications program, where each communications program is compiled into pre-defined computer languages that operate on specific pre-defined computer systems running pre-defined operating systems.

38. The apparatus of claim 37 wherein said compiling means further comprises means for prompting a user to enter or select parameters for each verb in each of the programs.

* * * * *